(12) United States Patent
Nishihara

(10) Patent No.: US 7,593,399 B2
(45) Date of Patent: *Sep. 22, 2009

(54) FRAME CONSTRUCTION METHOD, FRAME CONSTRUCTION DEVICE AND DATA TRANSFER SYSTEM CAPABLE OF ACCOMMODATING STM TRAFFIC AND BEST EFFORT TRAFFIC IN COMMON FRAME FORMAT

(75) Inventor: Motoo Nishihara, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 304 days.

This patent is subject to a terminal disclaimer.

(21) Appl. No.: 11/326,437

(22) Filed: Jan. 6, 2006

(65) Prior Publication Data

US 2006/0120365 A1 Jun. 8, 2006

Related U.S. Application Data

(63) Continuation of application No. 09/733,940, filed on Dec. 12, 2000, now Pat. No. 7,050,455.

(30) Foreign Application Priority Data

Dec. 14, 1999 (JP) ............................. 1999-354934

(51) Int. Cl.
*H04L 12/28* (2006.01)
(52) U.S. Cl. ...................................... 370/389; 370/474
(58) Field of Classification Search ................. 370/389, 370/392, 465, 469, 474, 476
See application file for complete search history.

(56) References Cited

U.S. PATENT DOCUMENTS 5,627,824 A 5/1997 Arnold ........................ 370/396
5,668,812 A * 9/1997 Akiyoshi ..................... 370/474

(Continued)

FOREIGN PATENT DOCUMENTS

CN 1211368 A 3/1999

(Continued)

OTHER PUBLICATIONS

J. Carlson et al., "Simple Data Link", Protocol Internet Draft, "draft-ietf-pppext-sdl-pol-00.txt", 1999, Lucent Technologies, IETF (Internet Engineering Task Force) with Abstract.

(Continued)

*Primary Examiner*—Ricky Ngo
*Assistant Examiner*—Christine Ng
(74) *Attorney, Agent, or Firm*—Harrity & Harrity, LLP

(57) ABSTRACT

A layer 1 network frame is disclosed that includes data of a layer 2 frame. A header of the layer 1 frame header includes: a packet length field to indicate a size of a payload portion of the layer 1 frame, a priority field to indicate a priority of the layer 1 frame, a protocol field to identify a protocol of the data in the layer 2 frame, a frame mode field to indicate a correspondence between the layer 1 frame and the layer 2 frame included within the payload, a stuff field to indicate whether stuff data is contained in the layer 1 frame, and a cyclic redundancy check (CRC) field to indicate a CRC result.

18 Claims, 19 Drawing Sheets

U.S. PATENT DOCUMENTS

| | | | |
|---|---|---|---|
| 5,699,369 A * | 12/1997 | Guha | 714/774 |
| 5,732,069 A * | 3/1998 | Nagino et al. | 370/219 |
| 5,909,427 A | 6/1999 | Manning et al. | 370/219 |
| 5,936,965 A | 8/1999 | Doshi et al. | 370/469 |
| 5,974,458 A | 10/1999 | Abe et al. | 709/224 |
| 6,075,787 A | 6/2000 | Bobeck et al. | 370/395.2 |
| 6,157,644 A | 12/2000 | Bernstein et al. | 370/392 |
| 6,219,358 B1 * | 4/2001 | Pinder et al. | 370/537 |
| 6,219,697 B1 * | 4/2001 | Lawande et al. | 709/221 |
| 6,271,946 B1 | 8/2001 | Chang et al. | 398/79 |
| 6,331,989 B1 | 12/2001 | Tezuka | 370/535 |
| 6,343,341 B1 | 1/2002 | Cabrera et al. | 711/111 |
| 6,414,967 B2 | 7/2002 | Van Grinsven et al. | 370/466 |
| 6,636,501 B1 * | 10/2003 | Dispensa et al. | 370/351 |
| 6,643,287 B1 | 11/2003 | Callon et al. | 370/392 |
| 7,050,455 B2 * | 5/2006 | Nishihara | 370/466 |

FOREIGN PATENT DOCUMENTS

| | | |
|---|---|---|
| EP | 1 089 514 A2 | 4/2001 |
| EP | 1 355 465 A1 | 10/2003 |
| JP | H10-233745 | 9/1998 |
| JP | 2000-502547 | 2/2000 |
| JP | 2001-186188 | 7/2001 |
| WO | WO98/18246 | 3/1998 |
| WO | WO 98/19412 | 5/1998 |

OTHER PUBLICATIONS

Shore, M. et al., "Cells in Frames: ATM Over Legacy Networks", 1998 1$^{st}$ IEEE International Conference on ATM. ICATM '98. Conference Proceedings. Colmar, France, Jun. 22-24, 1998. IEEE International Conference on ATM, New York, NY: IEEE, US. Jun. 22, 1998, pp. 418-422, XP010291023.

European Search Report, Jun. 23, 2005, 2 pages.

* cited by examiner

2 BYTES

PACKET LENGTH
PRIORITY | PROTOCOL
HEADER CRC16

STUFF
FRAME MODE

| FRAME MODE | |
|---|---|
| 00 | SINGLE FRAME |
| 01 | BOM |
| 10 | COM |
| 11 | EOM |

| STUFF | |
|---|---|
| 0 | NO STUFFING |
| 1 | STUFFING |

| PROTOCOL | |
|---|---|
| 000 | IPv4 |
| 001 | IPv6 |
| 010 | STM |
| 011 | ATM |
| 100 | OAM |
| 101 | DUMMY FRAME |

F I G. 13
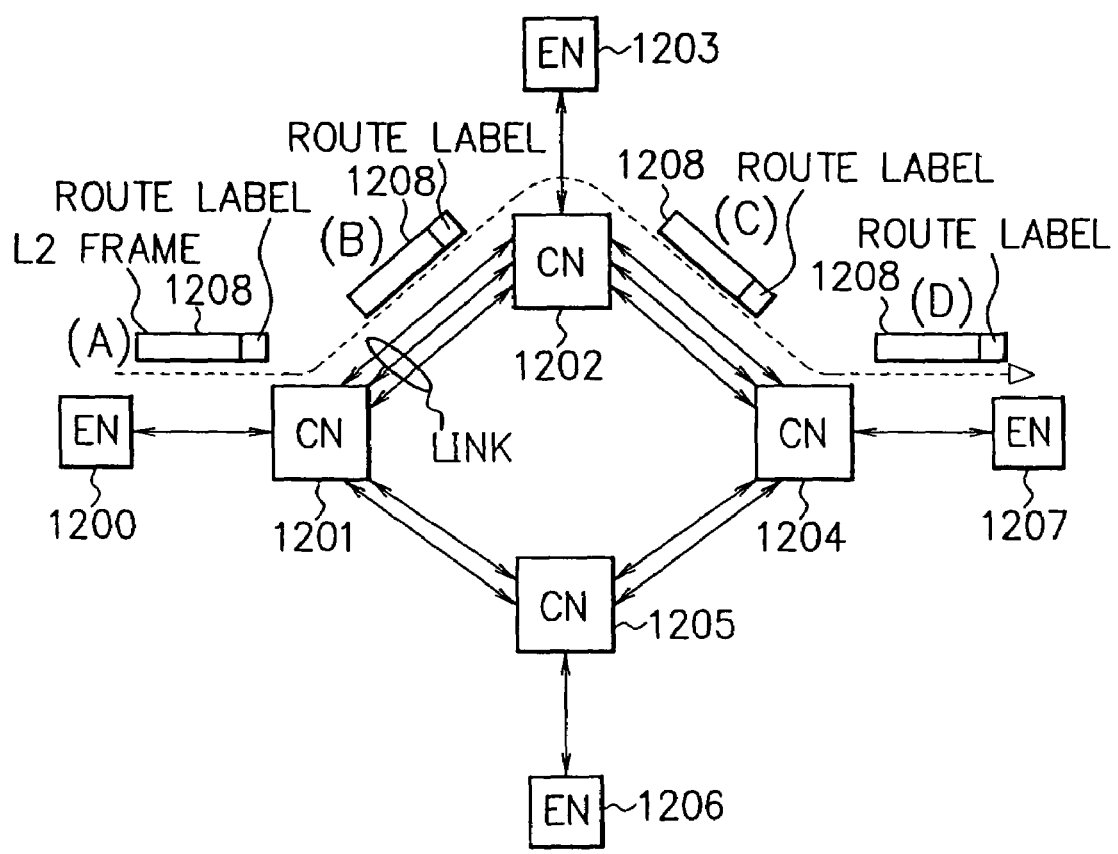

F I G. 14
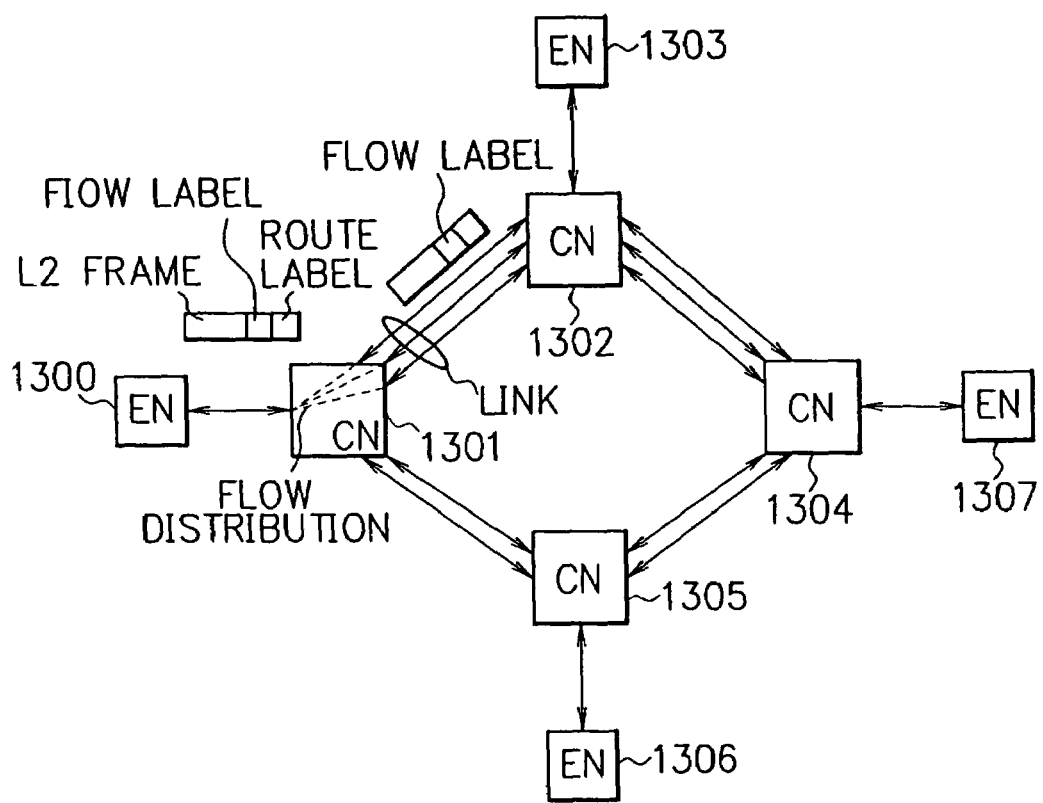

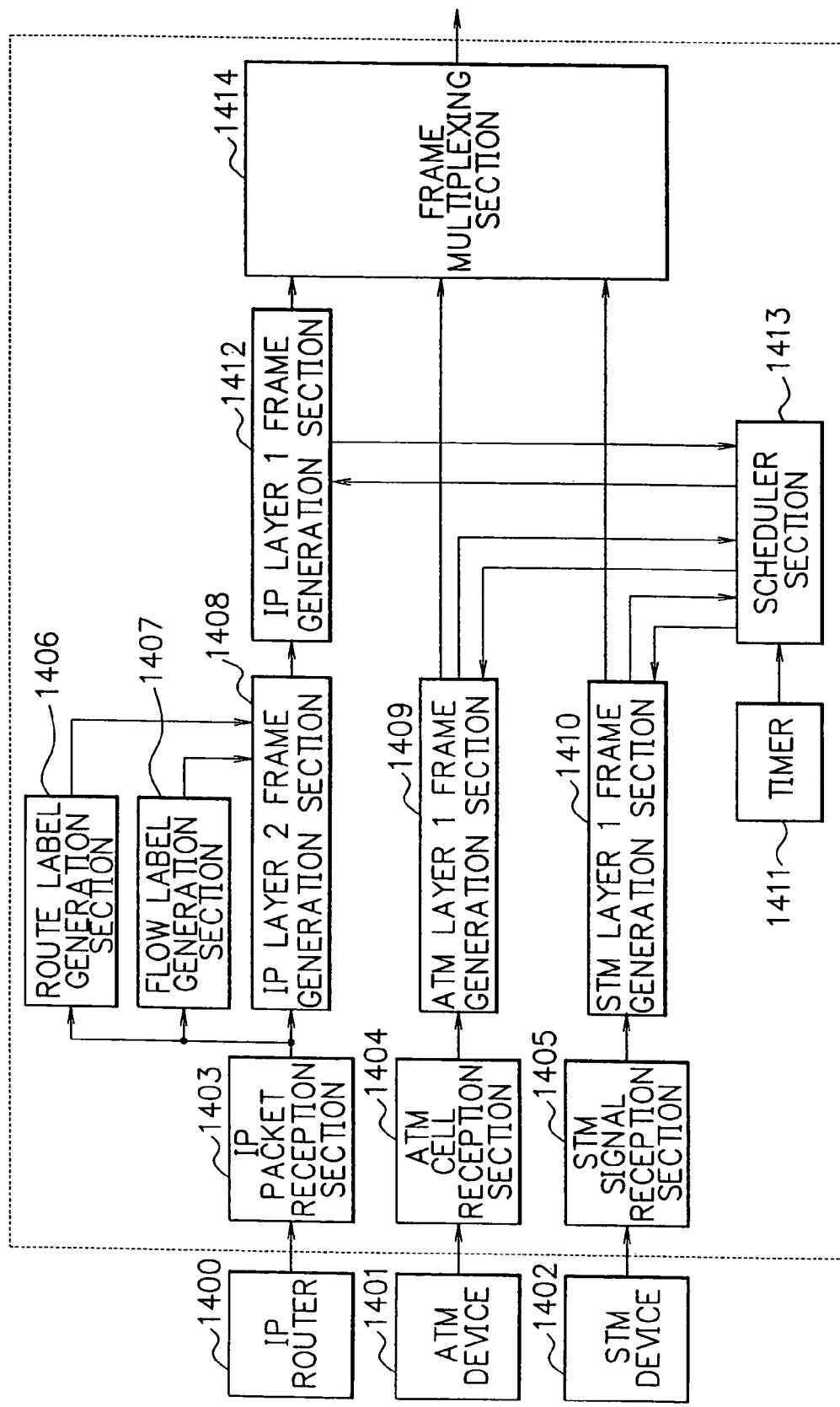
F I G. 15

F I G. 17
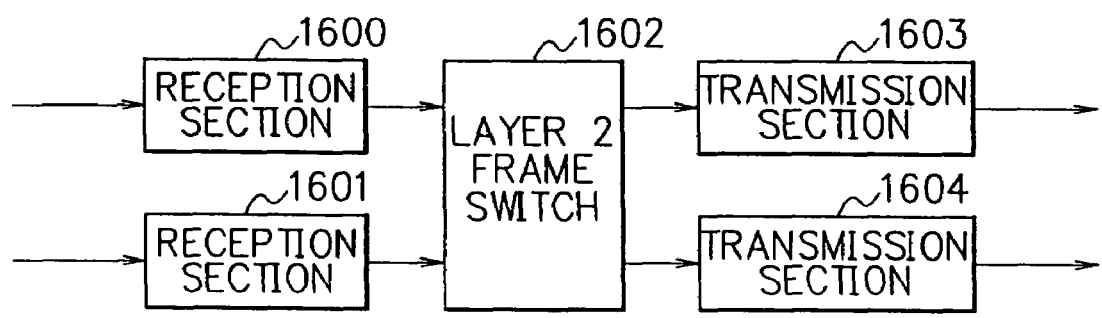

FIG. 22A

| PACKET LENGTH |
|---|
| PRIORITY \| PROTOCOL |
| HEADER CRC 16 |
| NULL |
| PAYLOAD CRC 16/32 |

FIG. 22B

| PACKET LENGTH |
|---|
| PRIORITY \| PROTOCOL |
| HEADER CRC 16 |
| PAYLOAD CRC 16/32 |

FIG. 22C

| PACKET LENGTH |
|---|
| PRIORITY \| PROTOCOL |
| HEADER CRC 16 |
| |
| PAYLOAD CRC 16/32 |

FRAME CONSTRUCTION METHOD, FRAME CONSTRUCTION DEVICE AND DATA TRANSFER SYSTEM CAPABLE OF ACCOMMODATING STM TRAFFIC AND BEST EFFORT TRAFFIC IN COMMON FRAME FORMAT

RELATED APPLICATIONS

This application is a Continuation of commonly assigned, co-pending U.S. patent application Ser. No. 09/733,940, filed Dec. 12, 2000, for FRAME CONSTRUCTION METHOD, FRAME CONSTRUCTION DEVICE AND DATA TRANSFER SYSTEM CAPABLE OF ACCOMMODATING STM TRAFFIC AND BEST EFFORT TRAFFIC IN COMMON FRAME FORMAT, the disclosure of which is hereby incorporated herein by reference.

BACKGROUND OF THE INVENTION

The present invention relates to a frame construction method which can accommodate STM (Synchronous Transfer Mode), ATM (Asynchronous Transfer Mode) and IP (Internet Protocol) by use of the same frame format and which can transfer a mixture of STM traffic and best effort traffic by use of the same frame format. The present invention also relates to a frame construction device for constructing such frames and a data transfer system for transferring such frames.

DESCRIPTION OF RELATED ART

Conventional networks have been constructed mainly in the fields of circuit-switched networks (telephone networks (voice transmission telecommunication networks), etc.) and networks employing private (leased) lines. However, with the rapid progress of the Internet communication of nowadays, data networks, especially networks employing the IP (Internet Protocol), are growing in high speed. Therefore, the remarkable increase of Internet traffic via modems over voice channels is putting pressure on the usage status of the circuit-switched network systems.

The IP data, after being switched (after being connected to an ISP (Internet Service Provider), is transferred in an IP network which is composed of leased lines and routers. Meanwhile, transfer capacity of data transfer systems in being increased by the speeding-up of SONET (Synchronous Optical NETwork)/SDH (Synchronous Digital Hierarchy) and the employment of DWDM (Dense Wavelength Division Multiplexing).

Under such complex circumstances of today, networks of various types are constructed and managed independently, and the construction, management and maintenance of networks are becoming more and more complicated.

In order to get rid of the complexity, techniques capable of accommodating the STM (Synchronous Transfer Mode), ATM (Asynchronous Transfer Mode) and IP (Internet Protocol) in a single packet transfer network are becoming necessary.

Such a packet transfer network, in which packet-based data transfer is conducted, is required to transfer STM data of the conventional synchronous transfer mode together with ATM data of the asynchronous transfer mode, and is also required to have the end-to-end circuit quality monitoring functions (end-to-end performance monitoring) which have been provided to the conventional networks.

Meanwhile, the packet transfer network is also needed to transfer high-priority traffic which is required by the next-generation packet communication, with the high quality level of the conventional STM signals.

The next-generation packet communication has to satisfy the above conditions, therefore, a frame construction method which can accommodate the STM, ATM and IP by use of the same frame format is required today, and propositions of data transfer systems based on such a frame construction method are sought for.

As a prior art concerning frame construction, the "Simple Data Link" protocol (SDL) has been disclosed in Internet Draft "draft-ietf-pppext-sdl-pol-00.txt", 1999, Lucent Technologies, IETF (Internet Engineering Task Force).

FIG. 1 is a schematic diagram showing a conventional frame format which is defined in the prior art (SDL). Referring to FIG. 1, the SDL frame format includes a header which is composed of two 2-byte fields "Packet Length" and "CRC16". The "Packet Length" field (identifier) indicates the length of the packet (i.e. the payload of the frame), and the "CRC16" field (identifier) indicates the CRC (Cyclic Redundancy Check) result for the "Packet Length" field. The payload of the SDL frame is a variable-length field (0~64 Kbytes).

A device that received the SDL frame conducts the CRC operation for the header of the frame and thereby establishes byte synchronization and frame synchronization. By use of the SDL frame format, continuous transfer of variable-length packets of a single protocol is made possible.

However, the above conventional SDL frame format can not transfer a mixture of signals of various protocols (a mixture of STM, ATM and IP, for example), since the conventional SDL frame format does not have functions for implementing periodical data transfer of the STM signals with fixed intervals nor does have information for designating transfer scheduling.

SUMMARY OF THE INVENTION

It is therefore the primary object of the present invention to provide a frame construction method which can accommodate STM, ATM and IP by use of the same frame format and which can transfer a mixture of STM traffic and best effort traffic by use of the same frame format.

Another object of the present invention is to provide a frame construction device for constructing frames which can accommodate STM, ATM and IP in the same frame format and which can transfer a mixture of STM traffic and best effort traffic in the same frame format.

One aspect is directed to a method of constructing a layer 1 frame. The method includes forming a payload for the layer 1 frame that includes data of a layer 2 frame and forming a layer 1 frame header. The layer 1 frame header includes: a packet length field to indicate a size of a payload portion of the layer 1 frame, a priority field to indicate a priority of the layer 1 frame, a protocol field to identify a protocol of the data in the layer 2 frame, a frame mode field to indicate a correspondence between the layer 1 frame and the layer 2 frame included within the payload, a stuff field to indicate whether stuff data is contained in the layer 1 frame, and a cyclic redundancy check (CRC) field to indicate a CRC result.

Another aspect is directed to a network device. The network device includes means for receiving one or more of an IP (Internet Protocol) packet, ATM (Asynchronous Transfer Mode) cell, or STM (Synchronous Transfer Mode) signal from another network device. The network device also includes means for forming a layer 1 frame that includes the received IP packet, ATM cell, or STM signal as payload data within the layer 1 frame. Further, the network device includes means for forming a header for the layer 1 frame, the header including: a packet length field to indicate a size of the payload data of the layer 1 frame, a priority field to indicate a priority of the layer 1 frame, a protocol field to identify whether the means for receiving received an IP packet, ATM cell, or STM signal, a frame mode field to indicate a correspondence between the layer 1 frame and the payload data within the layer 1 frame, a stuff field to indicate whether stuff data is contained in the layer 1 frame, and a cyclic redundancy check (CRC) field to indicate a CRC result.

Yet another aspect is directed to a data structure stored in a network device. The data structure comprises a payload field for a layer 1 frame, the payload including data for a layer 2 frame. The data structure further includes a layer 1 frame header including: a packet length field to indicate a size of a payload portion of the layer 1 frame, a priority field to indicate a priority of the layer 1 frame, a protocol field to identify a protocol of the data for the layer 2 frame, a frame mode field to indicate a correspondence between the layer 1 frame and the layer 2 frame included within the payload field, a stuff field to indicate whether stuff data is contained in the layer 1 frame, and a cyclic redundancy check (CRC) field to indicate a CRC result.

BRIEF DESCRIPTION OF THE DRAWINGS

The objects and features of the present invention will become more apparent from the consideration of the following detailed description taken in conjunction with the accompanying drawings, in which:

FIG. 13 is a schematic diagram showing the transfer of an IP layer 1 frame by use of a route label in accordance with the embodiment of the present invention;

FIG. 14 is a schematic diagram showing the transfer of an IP layer 1 frame by use of a flow label in accordance with the embodiment of the present invention;

FIG. 15 is a block diagram showing an example of the internal composition of a transmission section of a edge node of the data transfer system of FIG. 12;

FIG. 17 is a block diagram showing an example of the internal composition of a core node of the data transfer system of FIG. 12;

FIG. 22A is a schematic diagram showing the composition of a dummy frame which is employed in the embodiment of the present invention;

FIG. 22B is a schematic diagram showing the composition of a minimal dummy frame which is employed in the embodiment of the present invention; and FIG. 22C is a schematic diagram showing the composition of an OAM (Operating And Management) frame which is employed in the embodiment of the present invention.

DESCRIPTION OF THE PREFERRED EMBODIMENTS

Figure 1:
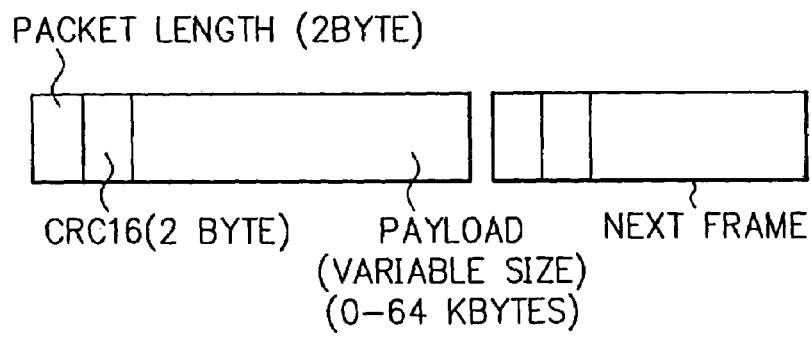
FIG. 1 is a schematic diagram showing a conventional frame format which is defined in SDL (Simple Data Link)

Referring now to the drawings, a description will be given in detail of preferred embodiments in accordance with the present invention.

The frame in accordance with an embodiment of the present invention, which is designed to accommodate STM (Synchronous Transfer Mode) signals, ATM (Asynchronous Transfer Mode) cells and IP packets in the same frame format, is implemented by a layer 1 frame and a layer 2 frame which is contained in the layer 1 frame. The layer 1 frame is a variable-length frame which enables variable-length packet transfer.

Figures 5A, 5B, 5C, 5D:
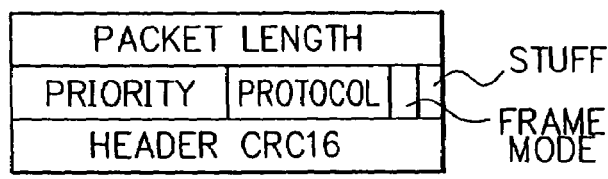
FIG. 5A is a schematic diagram showing the composition of the header of the layer 1 frame in accordance with the embodiment of the present invention.
FIG. 5B is a table showing an example of codes which are used for a "Frame Mode" identifier of the layer 1 frame header of FIG. 5A.
FIG. 5C is a table showing an example of codes which are used for a "Stuff" identifier of the layer 1 frame header of FIG. 5A.
FIG. 5D is a table showing an example of codes which are used for a "Protocol" identifier of the layer 1 frame header of FIG. 5A.

The header of the layer 1 frame includes a "Packet Length" identifier, a "Priority" identifier, a "Protocol" identifier, a "Frame Mode" identifier, a "Stuff" identifier and a "Header CRC16" identifier as shown in FIG. 5A. The "Packet Length" identifier indicates the length of a packet (the payload of the layer 1 frame). The "Priority" identifier indicates the priority of the packet. The "Protocol" identifier indicates a layer 2 protocol (STM, ATM, IP, etc.). The "Frame Mode" identifier indicates the type of the layer 1 frame, that is, the correspondence between the layer 1 frame and the layer 2 frame contained therein. The "Stuff" identifier indicates whether stuff data (data for stuffing) is included in the layer 1 frame or not. The "Header CRC16" identifier indicates the result of 16-bit CRC (Cyclic Redundancy Check) operation for the previous fields (the "Packet Length" identifier, the "Priority" identifier, the "Protocol" identifier, the "Frame Mode" identifier and the "Stuff" identifier).

Figure 8:
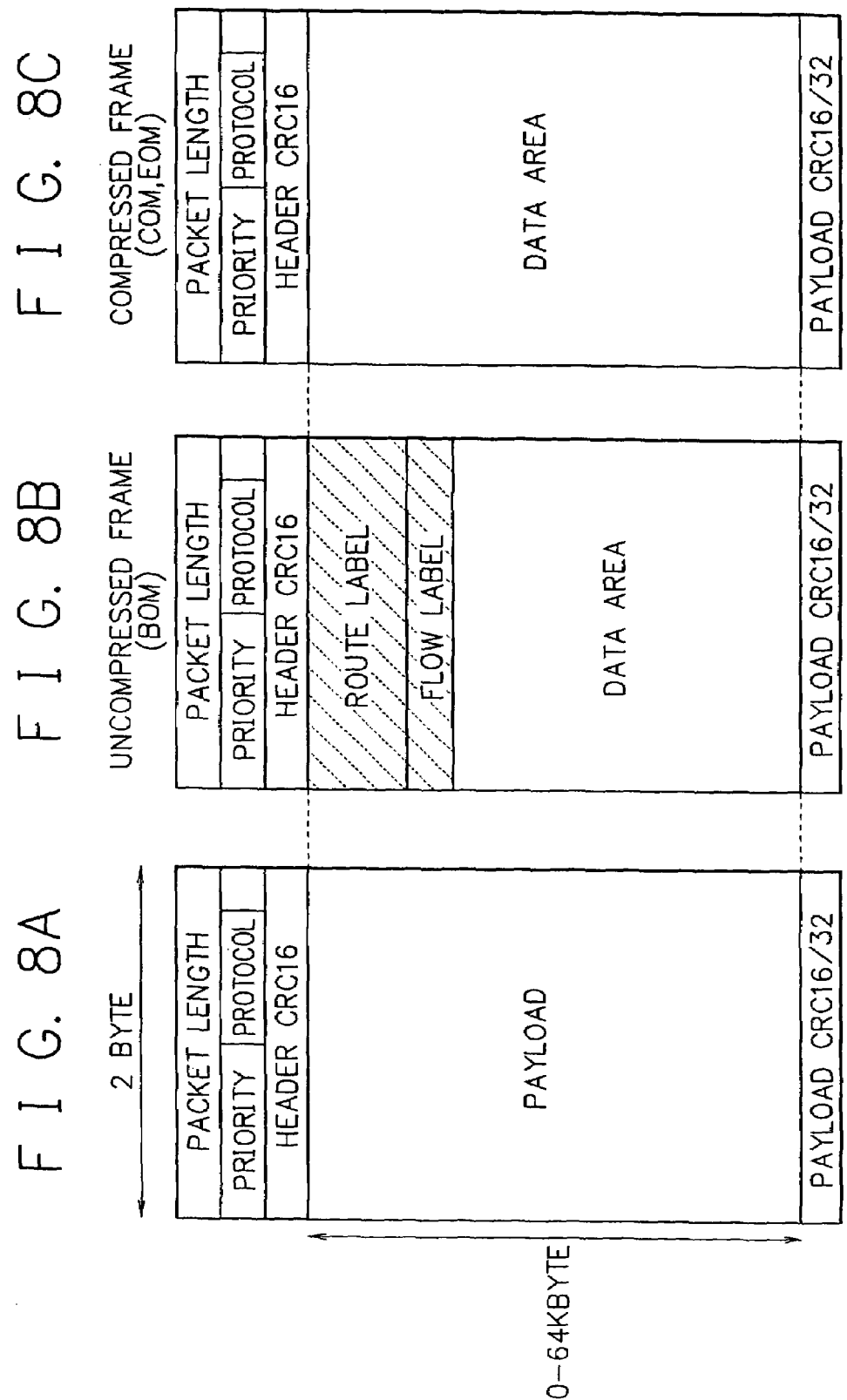
FIG. 8A is a schematic diagram showing the basic composition of the layer 1 frame.
FIG. 8B is a schematic diagram showing the composition of a BOM (Beginning Of Message) frame in accordance with the embodiment of the present invention.
FIG. 8C is a schematic diagram showing the composition of a COM (Continuation Of Message) frame and an EOM (End Of Message) frame in accordance with the embodiment of the present invention.

When the stuffing is not executed, the layer 1 frame includes a "Payload" field (hereafter, referred to as a "layer 1 frame payload" or a "payload") just after the header as shown in FIG. 8A. The layer 1 frame payload is a variable-length field (0~64 Kbytes). After the "payload, the layer 1 frame includes a "Payload CRC" field which indicates the result of CRC operation for the layer 1 frame payload.

Figure 7:
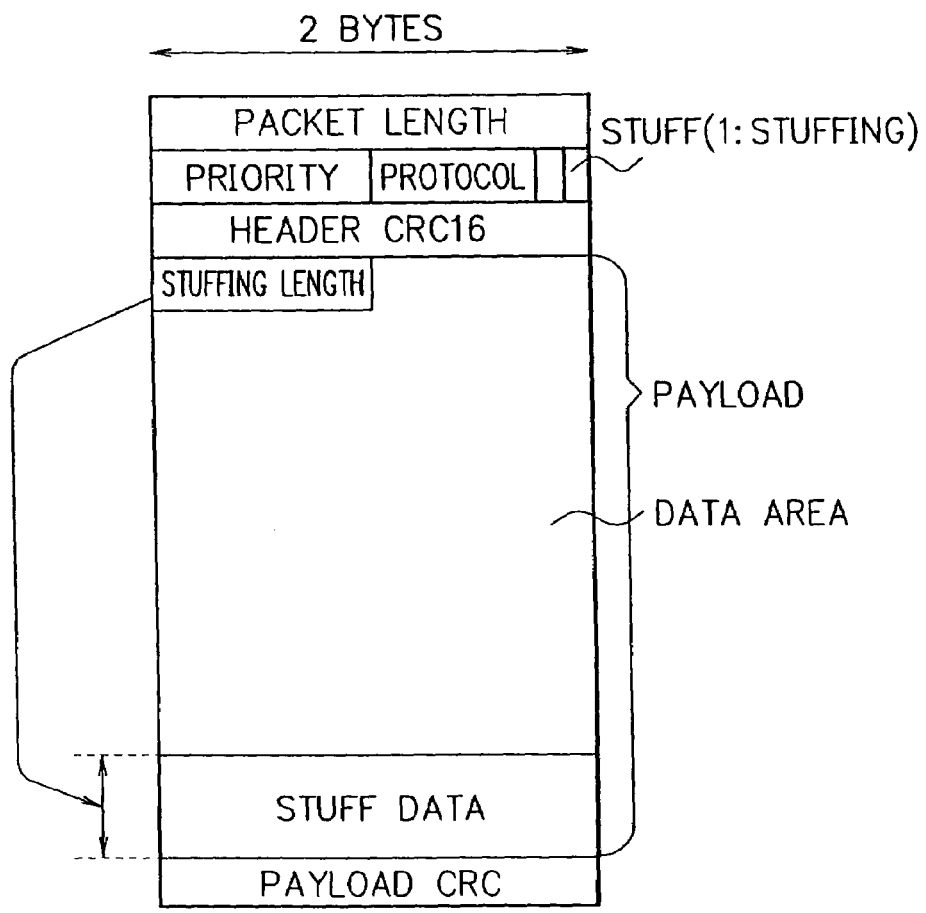
FIG. 7 is a schematic diagram showing the composition of the layer 1 frame when the stuffing is executed.

Also when the stuffing is executed, the layer 1 frame includes a payload after the header as shown in FIG. 7. The layer 1 frame payload is a variable-length field (0~64 Kbytes). In this case, a "Stuffing Length" identifier for indicating the length of the stuff data is provided to the top of the layer 1 frame payload. The stuff data is inserted at the end of the layer 1 frame payload. The stuff data is data for adjusting the length of the layer 1 frame. The length of the stuff data is described in the "Stuffing Length" identifier at the transmitting end. After the payload, the layer 1 frame includes a "Payload CRC" field which indicates the result of CRC operation for the layer 1 frame payload.

The "Header CRC16" identifier of the layer 1 frame header enables a device that receives the layer 1 frame to establish bit synchronization, byte synchronization and frame synchronization. The "Payload CRC" field is used for monitoring payload data quality. Therefore, the layer 1 frame enables a device at the receiving end to conduct bit synchronization, byte synchronization, frame synchronization and payload data quality monitoring. In short, the layer 1 frame according to the present invention can implement the basic functions of the conventional layer 1.

The aforementioned layer 2 frame of this embodiment is packed in the payload of the layer 1 frame. The layer 2 frame can accommodate and transfer multi-protocol data (STM signals, ATM cells, IP packets, etc.). The protocol of the data contained in the layer 2 frame is indicated by the "Protocol" identifier of the layer 1 frame header.

The above multiprotocol includes ATM, STM, IPv4 (Internet Protocol version 4), IPv6 (Internet Protocol version 6), MPLS (MultiProtocol Label Switching), etc.

The header of the layer 2 frame is placed at the top of the layer 1 frame payload. Incidentally, in the case where the stuffing is executed (that is, in the case where the "Stuffing Length" identifier is placed at the top of the layer 1 frame payload), the layer 2 frame header is placed after the "Stuffing Length" identifier. The length of the layer 2 frame header can be changed depending on the protocol of the data which is contained and transferred in the layer 2 frame.

Here, we define two types of labels as the header of the layer 2 frame in the case where an IP packet is transferred in the layer 1 frame: a route label and a flow label. The route label is a field to be referred to in the routing through nodes of a network. The flow label is a field to be used for selecting one OCH (Optical CHannel) (defined by a transmission line and a wavelength) to be used when there are two or more OCHs between two nodes. Further, as a special-purpose layer 1 frame for monitoring a path between the ingress point and the egress point of a network, an OAM (Operating And Management) frame is defined.

In cases where an STM signal or ATM cells are transferred in the layer 1 frame, the route label can be used for the label information in the layer 2 frame header for the routing of the layer 1 frame. In these cases, the flow label is not used, since the amounts of STM traffic and ATM traffic are smaller than that of IP traffic and the transfer of the layer 1 frames for STM and ATM can be conducted by use of a preset wavelength between nodes.

In the following, an explanation will be given on the segmentation of the layer 2 frame. The following explanation will be given assuming that the layer 2 frame is required to transfer CBR (Constant Bit Rate) traffic such as STM signals. Incidentally, in ordinary data transfer, one layer 2 frame corresponds to one layer 1 frame.

In ordinary packet-based data transfer such as POS (Packet Over Sonet, RFC2615 [Internet Engineering Task Force]), frames containing CBR traffic have to be transferred with a constant cycle (125 μsec).

However, the transfer of a CBR traffic frame is generally suspended until the transfer of a pervious layer 2 frame (a layer 2 frame containing best effort traffic etc.) is finished. Therefore, the STM signals can not be transferred with a constant cycle in ordinary packet-based data transfer, since each packet is a variable-length packet.

In order to avoid such a problem, in the frame construction method of this embodiment, a long layer 2 frame of a low priority is partitioned into segments and distributed to two or more layer 1 frames.

A high priority layer 1 frame (such as the CBR traffic) is forcibly transferred by means of interruption even if a low priority layer 2 frames are being transferred.

The layer 1 frames containing the partitioned layer 2 frames can be classified into three types: BOM (Beginning Of Message) frames, COM (Continuation Of Message) frames and EOM (End Of Message) frames. The BOM frame is a layer 1 frame containing the front end of a layer 2 frame. The EOM frame is a layer 1 frame containing the rear end of a layer 2 frame. The COM frame is a layer 1 frame which contains a partitioned segment of a layer 2 frame but does not contain the front end not rear end of the layer 2 frame. In short, a low priority layer 2 frame (from its front end to rear end) is partitioned into segments and distributed to a BOM frame, one or more (or zero) COM frames and an EOM frame.

Whether a layer 1 frame is a frame including the partitioned segments of a layer 2 frame (BOM frame, COM frame or EOM frame) or not (single frame) can be judged by referring to the "Frame Mode" identifier which is included in the layer 1 frame header.

A device that terminates the layer 1 frames refers to the "Priority" identifiers and the "Protocol" identifier in the headers of the layer 1 frames and thereby extracts layer 1 frames having the same "Priority" identifier and "Protocol" identifier. By such operation, a BOM frame, COM frames and an EOM frame containing segments of a partitioned layer 2 frame are received and transferred successively, thereby the original layer 2 frame can be reconstructed (recombined and restored) easily.

In the frame construction method of this embodiment, there are cases where the layer 2 frame header of a layer 1 frame is omitted. When a layer 2 frame is partitioned into segments and distributed to a BOM frame, COM frames and an EOM frame, header information to be held by the COM frames and the EOM frame is the same as that of the BOM frame. Therefore, omission of the layer 2 frame header information is allowed in the COM frames and the EOM frame of this embodiment. In other words, the BOM frame contains the layer 2 frame header, however, the COM frames and the EOM frame are not provided with the layer 2 frame headers. Thus, the BOM frame is called an "uncompressed frame", whereas the COM frames and the EOM frame are called "compressed frames".

In the following, an explanation will be given on data transfer by use of aggregate frames in accordance with the embodiment of the present invention.

The layer 2 frame of this embodiment is capable of accommodating and transferring two or more data units when transferring data of an upper-layer protocol (STM, ATM, IP, MPLS, etc.)

For example, the STM signals are transferred in units of N bytes (not in units of bytes). By assigning each byte to a 64 Kbps channel, an N-channel trunk signal of N×64 Kbps is transferred between two conventional switches.

In this case, a network edge device (such as an edge node) for generating the layer 2 frames collects STM data in units of 125 μsec and packs them in the layer 2 frames. Similarly, for transmitting ATM signals, the network edge device packs a plurality of ATM cells in a layer 2 frame and transmits the layer 2 frame.

In the following, periodical STM signal transfer (at fixed intervals of 125 μsec) which is conducted in this embodiment will be explained.

When layer 1 frames containing STM signals (hereafter, also referred to as "STM layer 1 frames") have to be transferred at fixed intervals, the length of a layer 1 frame which is transferred before the STM layer 1 frame becomes important.

For instance, even when there are no layer 1 frames to be transferred before the STM layer 1 frame, bit synchronization, byte synchronization and frame synchronization which are implemented by the layer 1 frames has to be maintained. In such cases, a dummy frame is transferred before the STM layer 1 frame and thereby an idle transfer space between the STM layer 1 frames are filled up.

Whether a layer 1 frame is a dummy frame or not can be judged by referring to the "Protocol" identifier of the layer 1 frame header. The dummy frame is a variable-length frame.

When the idle transfer space before the transfer of an STM layer 1 frame is shorter than a shortest dummy frame (minimal dummy frame), the aforementioned stuff data is inserted in a layer 1 frame that is transferred before the idle transfer space, thereby the idle transfer space is filled up and the layer 1 frames become continuous.

The length of the stuff data is shorter than that of the minimal dummy frame. The minimal dummy frame is composed of the layer 1 frame header and the "Payload CRC" field, therefore, the stuff data length is shorter than the length of the layer 1 frame header and the length of the "Payload CRC" field added together. Concretely, the stuff data length becomes several bytes.

By the insertion of the dummy frames and the stuff data, the continuous transfer of the layer 1 frames are realized, the frame synchronization can be maintained, and the periodical transfer of the STM layer 1 frames at precisely fixed intervals (125 μsec) is made possible.

Figure 2:
FIG. 2 is a schematic diagram showing a basic frame format of a layer 1 frame in accordance with an embodiment of the present invention.

FIG. 2 is a schematic diagram showing the basic frame format of the layer 1 frame in accordance with the embodiment of the present invention. As shown in FIG. 2, the layer 1 frame includes the layer 1 frame header (6 byte) and the layer 1 frame payload (0-64 Kbytes). The "Payload CRC" field, indicating the result of CRC16 or CRC32 operation for the layer 1 frame payload, is added optionally.

Figure 3:
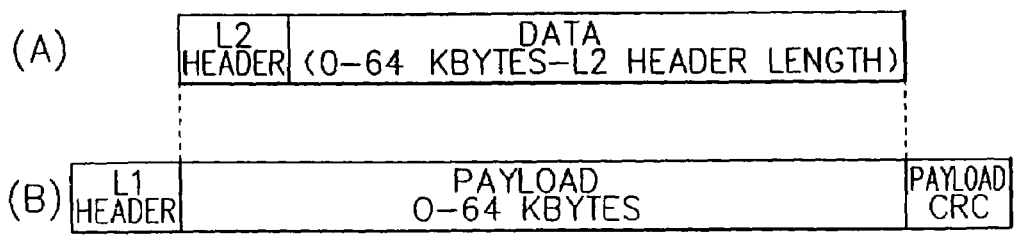
FIG. 3 is a schematic diagram showing the correspondence between the basic layer 1 frame of FIG. 1 and a basic layer 2 frame in accordance with the embodiment of the present invention.

FIG. 3 is a schematic diagram showing the correspondence between the basic layer 1 frame and a basic layer 2 frame. Referring to FIG. 3, the layer 2 frame is composed of a layer 2 header (L2 header) and a data section. As shown in FIG. 3, the layer 2 frame corresponds to the payload (0~64 Kbytes) of the layer 1 frame.

Figure 4A:
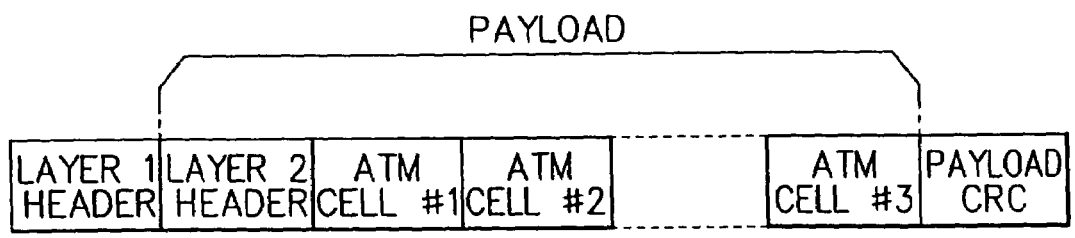
FIG. 4A is a schematic diagram showing a layer 1 frame in accordance with the embodiment of the present invention for transferring ATM cells.
Figure 4B:
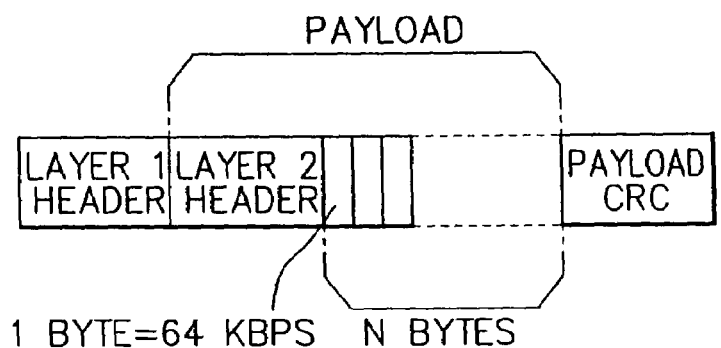
FIG. 4B is a schematic diagram showing a layer 1 frame in accordance with the embodiment of the present invention for transferring an STM signal.
Figure 4C:
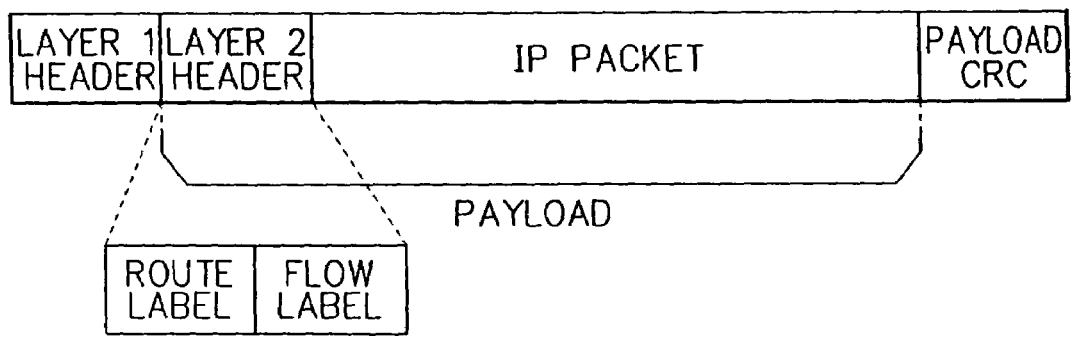
FIG. 4C is a schematic diagram showing a layer 1 frame in accordance with the embodiment of the present invention for transferring an IP packet.

FIGS. 4A through 4C are schematic diagrams showing frames in accordance with the embodiment of the present invention when ATM cells, STM signals and IP packets are packed in the layer 2 frames.

In the payload of the layer 1 frame which is shown in FIG. 4A, a layer 2 frame, including a header (L2 header) and a plurality of ATM cells having the same VPI (Virtual Path Identifier), is packed.

In the payload of the layer 1 frame which is shown in FIG. 4B, a layer 2 frame, including a header (L2 header) and STM signals (N×64 Kbps voice data addressed to the same destination) is packed.

In the payload of the layer 1 frame which is shown in FIG. 4C, a layer 2 frame, including a header (L2 header) and an IP packet, is packed.

FIG. 5A is a schematic diagram showing the composition of the header of the layer 1 frame in accordance with the embodiment of the present invention. As shown in FIG. 5A, the layer 1 frame header (L1 header) includes the "Packet Length" identifier, the "Priority" identifier, the "Protocol" identifier, the "Frame Mode" identifier, the "Stuff" identifier and the "Header CRC16" identifier. In the case where the stuff data is inserted in the layer 1 frame payload, the "Stuffing Length" identifier indicating the length of the stuff data is added to the layer 1 frame header.

The "Packet Length" identifier indicates the length of the payload of the layer 1 frame. The "Priority" identifier indicates the priority of the layer 1 frame. The "Protocol" identifier indicates a protocol of the data contained in the layer 2 frame. The "Frame Mode" identifier indicates a method for packing a layer 2 frame in one or more layer 1 frames, that is, whether the layer 1 frame is a single frame, a BOM frame, a COM frame or an EOM frame. The "Stuff" identifier indicates whether the stuff data exists in the layer 1 frame or not. The "Header CRC16" identifier indicates the result of 16-bit CRC (Cyclic Redundancy Check) operation for the above fields (identifiers). The "Stuffing Length" identifier indicates the length of the stuff data.

FIG. 5B is a table showing an example of codes which are used for the "Frame Mode" identifier. Referring to FIG. 5B, the "Frame Mode" identifiers (codes) "00", "01", "10" and "11" denote a single frame, a BOM frame, a COM frame and an EOM frame, respectively.

FIG. 5C is a table showing an example of codes which are used for the "Stuff" identifier. Referring to FIG. 5C, the "Stuff" identifier (code) "0" indicates that the stuffing is not executed, and the "Stuff" identifier (code) "1" indicates that the stuffing is executed.

FIG. 5D is a table showing an example of codes which are used for the "Protocol" identifier. Referring to FIG. 5D, the "Protocol" identifiers (code) "000", "001", "010", "011", "100", "101" denote IPv4, IPv6, STM, ATM, OAM, and a dummy frame, respectively.

Figure 6:
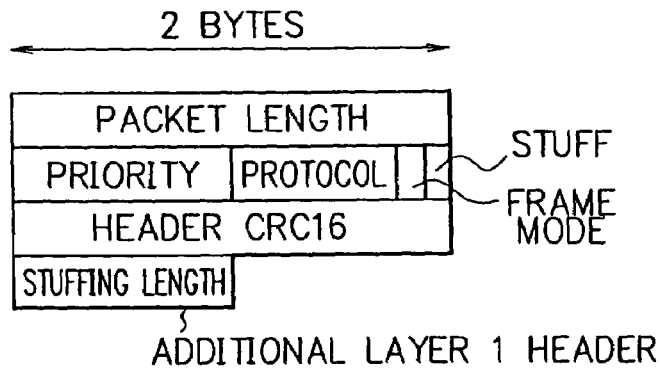
FIG. 6 is a schematic diagram showing a case where a "Stuffing Length" identifier is added to the layer 1 frame header of FIG. 5A when stuffing is executed.

As shown in FIGS. 6 and 7, the "Stuffing Length" identifier is added to the layer 1 frame header when the stuffing is executed and the stuff data is inserted in the bottom of the layer 1 frame payload.

In the following, a data transfer method for transferring the layer 1 frames of this embodiment will be explained. When layer 1 frames containing STM signals (STM layer 1 frames) and layer 1 frames containing ATM cells (hereafter, referred to as "ATM layer 1 frames") are transferred, the STM layer 1 frames and the ATM layer 1 frames are transmitted periodically. Layer 1 frames containing IP packets (hereafter, referred to as "IP layer 1 frames") are accommodated in remaining spaces between the STM layer 1 frames and the ATM layer 1 frames.

In this embodiment, there are two priority levels with regard to the IP packets: a primary IP packet and a best effort IP packet. The primary IP packet is an IP packet whose bandwidth has to be guaranteed or whose delay is required to be short (delay-sensitive). The primary IP packet is transferred with higher priority than the best effort IP packet.

Therefore, the STM layer 1 frames and the ATM layer 1 frames are transmitted at predetermined periods, and the layer 1 frames containing the primary IP packets (hereafter, referred to as "primary IP layer 1 frames") and the layer 1 frames containing the best effort IP packets (hereafter, referred to as "best effort IP layer 1 frames") are successively transmitted in between the STM layer 1 frames and the ATM layer 1 frames.

When the transmission of a variable-length best effort IP packet (contained in a best effort IP layer 2 frame in a best effort IP layer 1 frame) overlapped with the periodical transmission of the STM/ATM layer 2 frames (contained in the STM/ATM layer 1 frames), the best effort IP layer 2 frame is partitioned into segments and distributed to two or more best effort IP layer 1 frames. The best effort IP layer 1 frames containing the partitioned segments of a best effort IP layer 2 frame include a BOM frame, COM frames and an EOM frame, as mentioned before.

Figure 10:
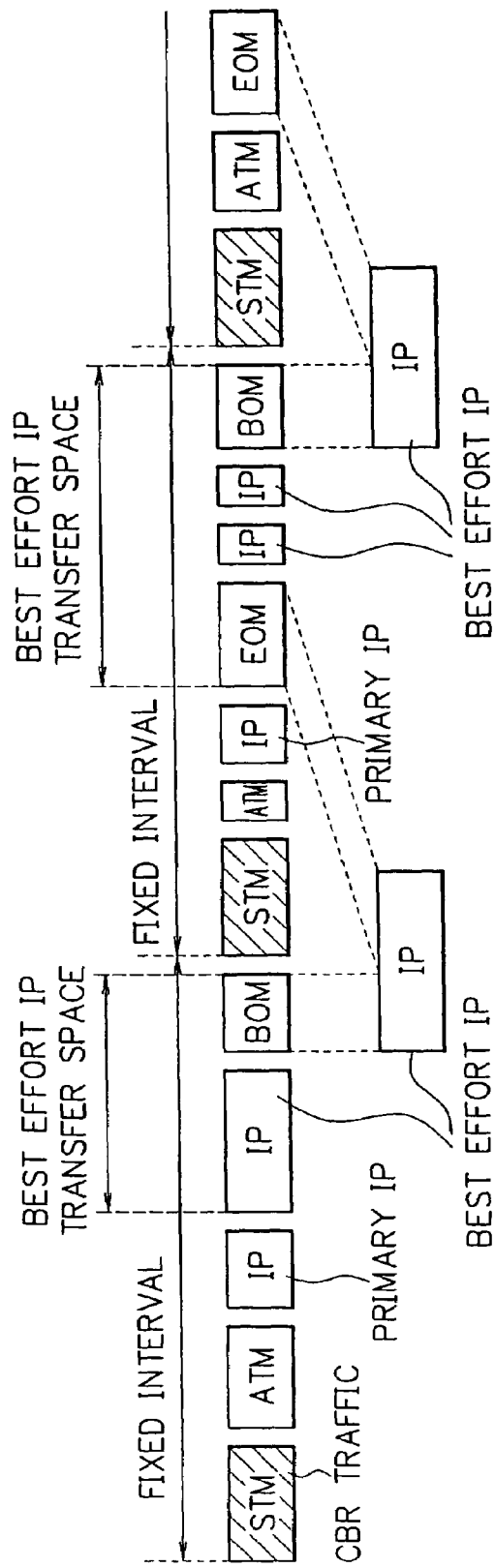
FIG. 10 is a schematic diagram showing an example of frame-multiplexed layer 1 frames in accordance with the embodiment of the present invention, in which a best effort IP layer 2 frame is partitioned into segments and distributed to a BOM frame and an EOM frame.

FIG. 10 is a schematic diagram showing an example of frame-multiplexed layer 1 frames in accordance with the embodiment, in which a best effort IP layer 2 frame is partitioned into segments and distributed to a BOM frame and an EOM frame. Referring to FIG. 10, a best effort IP layer 2 frame is partitioned into two segments and distributed to a BOM (Beginning Of Message) frame (a layer 1 frame containing the front end of the layer 2 frame) and an EOM (End Of Message) frame (a layer 1 frame containing the rear end of the layer 2 frame).

Figure 9:
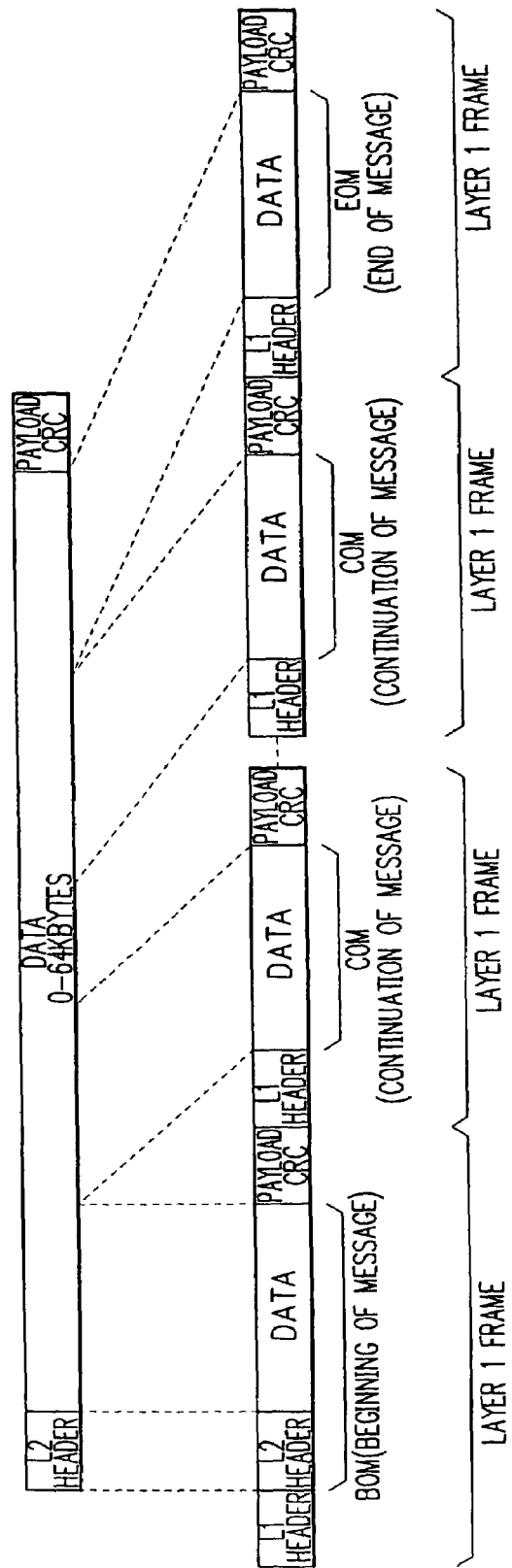
FIG. 9 is a schematic diagram showing an example of partitioning of the layer 2 frame in accordance with the embodiment of the present invention, in which a layer 2 frame is partitioned into segments and distributing to a BOM frame, two COM frames and an EOM frame.
Figure 11:
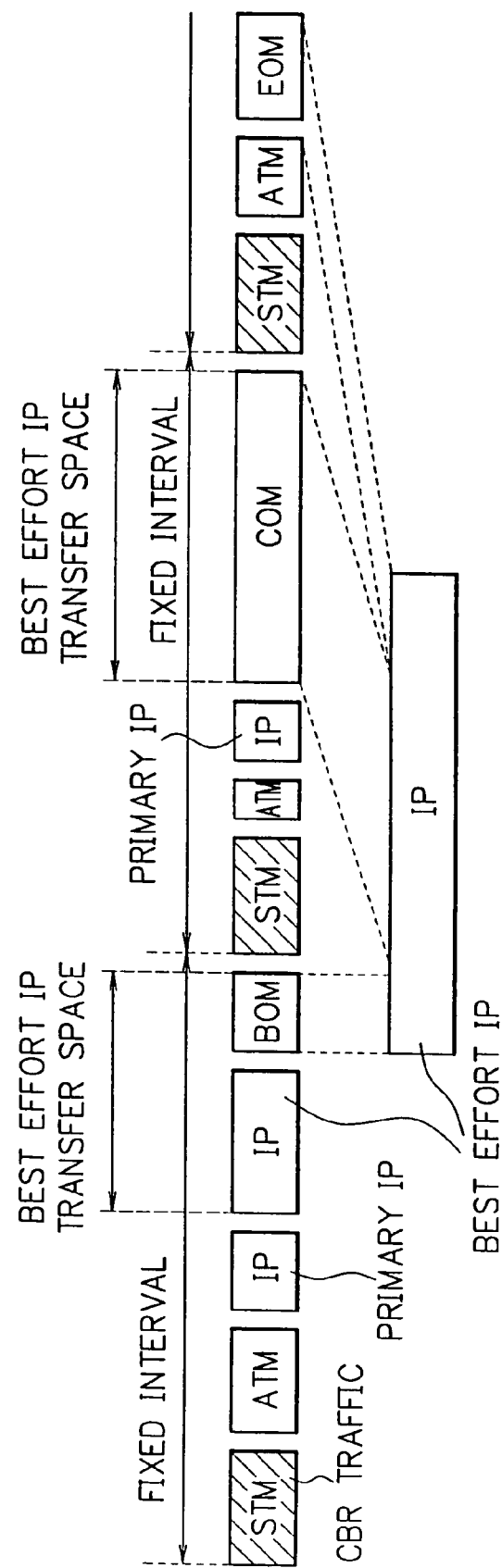
FIG. 11 is a schematic diagram showing an example of frame-multiplexed layer 1 frames in accordance with the embodiment of the present invention, in which a best effort IP layer 2 frame is partitioned into segments and distributed to a BOM frame, a COM frame and an EOM frame.

FIG. 11 is a schematic diagram showing an example of frame-multiplexed layer 1 frames in accordance with the embodiment, in which a best effort IP layer 2 frame is partitioned into segments and distributed to a BOM frame, a COM frame and an EOM frame. Referring to FIG. 11, a best effort IP layer 2 frame is partitioned into three segments and distributed to a BOM frame, a COM (Continuation Of Message) frame (a layer 1 frame containing a partitioned segment of a layer 2 frame but not containing the front end or rear end of the layer 2 frame) and an EOM (End Of Message) frame. As shown in FIG. 9, the number of COM frames between a BOM frame and an EOM frame is not limited to one. Two or more COM frames can be generated between the BOM frame and the EOM frame depending on the length of the best effort IP layer 2 frame. When the layer 2 frame to be partitioned is short, no COM frames are generated between the BOM frame and the EOM frame, as shown in FIG. 10.

Referring to FIGS. 10 and 11, if layer 1 frames having the same "Priority" identifier and "Protocol" identifier are extracted, the BOM frame, the COM frames and the EOM frame containing the partitioned segments of a layer 2 frame are received and transferred in sequence.

A device receiving and terminating the layer 1 frames can discriminate between a BOM frame, a COM frame, an EOM frame and a single frame by referring to the "Frame Mode" identifier which is included in the header of the layer 1 frame (see FIG. 5B).

If the "Frame Mode" identifier is "00" (single frame), a best effort IP packet has been packed in the layer 1 frame without being partitioned.

If the "Frame Mode" identifier is "01" (BOM frame), a best effort IP packet has been partitioned into two or more segments, and the layer 1 frame contains the first segment (front end) of the best effort IP packet.

If the "Frame Mode" identifier is "10" (COM frame), a best effort IP packet has been partitioned into two or more segments, and the layer 1 frame contains a segment of the best effort IP packet that is not the first segment not the last segment.

If the "Frame Mode" identifier is "11" (EOM frame), a best effort IP packet has been partitioned into two or more segments, and the layer 1 frame contains the last segment (rear end) of the best effort IP packet.

The BOM frame, the COM frames and the EOM frame are transferred successively and a device at the receiving end extracts layer 1 frames having the same "Priority" identifier and "Protocol" identifier, therefore, when the device received a COM frame or an EOM frame ("Frame Mode" identifier: "10" or "11"), the device can judge that the COM/EOM frame can be used together with a previously received BOM frame for reconstructing a layer 2 frame.

Therefore, in this embodiment, the layer 2 frame contained in a COM frame or an EOM frame is not provided with a layer 2 frame header. By the omission of the layer 2 frame header in the COM/EOM frames, the payloads of the layer 2 frames can be made longer in the COM/EOM frames, thereby the amount of transferred information can be increased.

The frame format of the layer 1 frame will be explained in detail referring to FIGS. 8A through 8C. FIG. 8A is a schematic diagram showing the basic composition of the layer 1 frame of this embodiment. Referring to FIG. 8A, the header of the layer 1 frame includes the "Packet Length" identifier, the "Priority" identifier, the "Protocol" identifier, the "Frame Mode" identifier (unshown in FIG. 8A), the "Stuff" identifier (unshown in FIG. 8A) and the "Header CRC16" identifier. The payload of the layer 1 frame is placed in a variable-length field (0~64 Kbytes) after the header. After the payload, a "Payload CRC16" field or a "Payload CRC32" field is added as an option.

FIG. 8B is a schematic diagram showing the composition of the BOM frame of this embodiment. In the BOM frame as an uncompressed frame, the layer 2 frame header (the route label and the flow label) and the layer 2 frame payload (data area) are packed in the layer 1 frame payload.

FIG. 8C is a schematic diagram showing the composition of the COM/EOM frame of this embodiment. In the COM/EOM frame as a compressed frame, only the layer 2 frame payload (data area) are packed in the layer 1 frame payload. The layer 2 frame header (the route label and the flow label) are omitted.

In this embodiment, the layer 1 frames containing STM signals (STM layer 1 frames) are transferred at fixed intervals (125 μsec) as shown in FIGS. 10 and 11. A switching section of a node (which relays the layer 1 frames) transmits the STM signals (STM layer 1 frames) as traffic of the highest priority.

For the implementation of the periodical transmission of the STM layer 1 frames, a layer 1 frame containing a best effort IP packet (best effort IP layer 1 frame) has to be partitioned into a BOM frame, COM frames and an EOM frame when the transmission of the best effort IP layer 1 frame overlaps with the transmission of an STM layer 1 frame. Incidentally, a BOM/COM/EOM frame which will be used in the following explanation is a best effort IP layer 1 frame. The STM layer 1 frame, the ATM layer 1 frame and the primary IP layer 1 frame are not partitioned and transferred as single frames.

However, the periodical transmission of the STM layer 1 frames can not be realized only by the partitioning of the best effort IP layer 1 frame and the high priority transmission of the STM layer 1 frames.

As shown in FIGS. 10 and 11, the STM layer 1 frames are transferred with the highest priority at fixed intervals (125 μsec), and layer 1 frames containing ATM cells (ATM layer 1 frames) and layer 1 frames containing primary IP packets (primary IP layer 1 frames) are also transferred with high priority. Therefore, the best effort IP layer 1 frames have to be transferred in transfer spaces (idle time) between the STM layer 1 frames, the ATM layer 1 frames and the primary IP layer 1 frames.

The length L of the transfer space (idle time) in which the best effort IP layer 1 frame can be transferred (hereafter, referred to as a "best effort IP transfer space") changes depending on the lengths of the ATM layer 1 frames and the primary IP layer 1 frames. The transfer of the STM layer 1 frames has to be conducted at predetermined periods as mentioned above. Therefore, the length of the best effort IP layer 1 frame has to be adjusted to the length L of the best effort IP transfer space.

In the following, an operation of a device at the transmitting end for filling up the best effort IP transfer space (to the length: L) by use of a dummy frame or stuff data will be explained referring to FIGS. 7, 21, 22A and 22B.

The aforementioned dummy frame is a layer 1 frame whose payload is filled with null data as shown in FIG. 22A. A dummy frame whose null area is 0 Kbyte is the aforementioned "minimal dummy frame". The minimal dummy frame is composed of the layer 1 frame header and the "Payload CRC" field only, as shown in FIG. 22B.

The stuff data is data which is inserted into the best effort IP layer 1 frame payload for adjusting the length of the best effort IP layer 1 frame to the length L of the best effort IP transfer space (see FIG. 7). As shown in FIG. 7, the stuff data is added after the data area of the payload of the best effort IP layer 1 frame. In the case where the stuff data is added to the best effort IP layer 1 frame payload, the "Stuffing Length" identifier is provided to the top of the payload. In this case, code "1" is described in the "Stuff" identifier of the header as shown in FIGS. 5C and 7.

Figure 21:
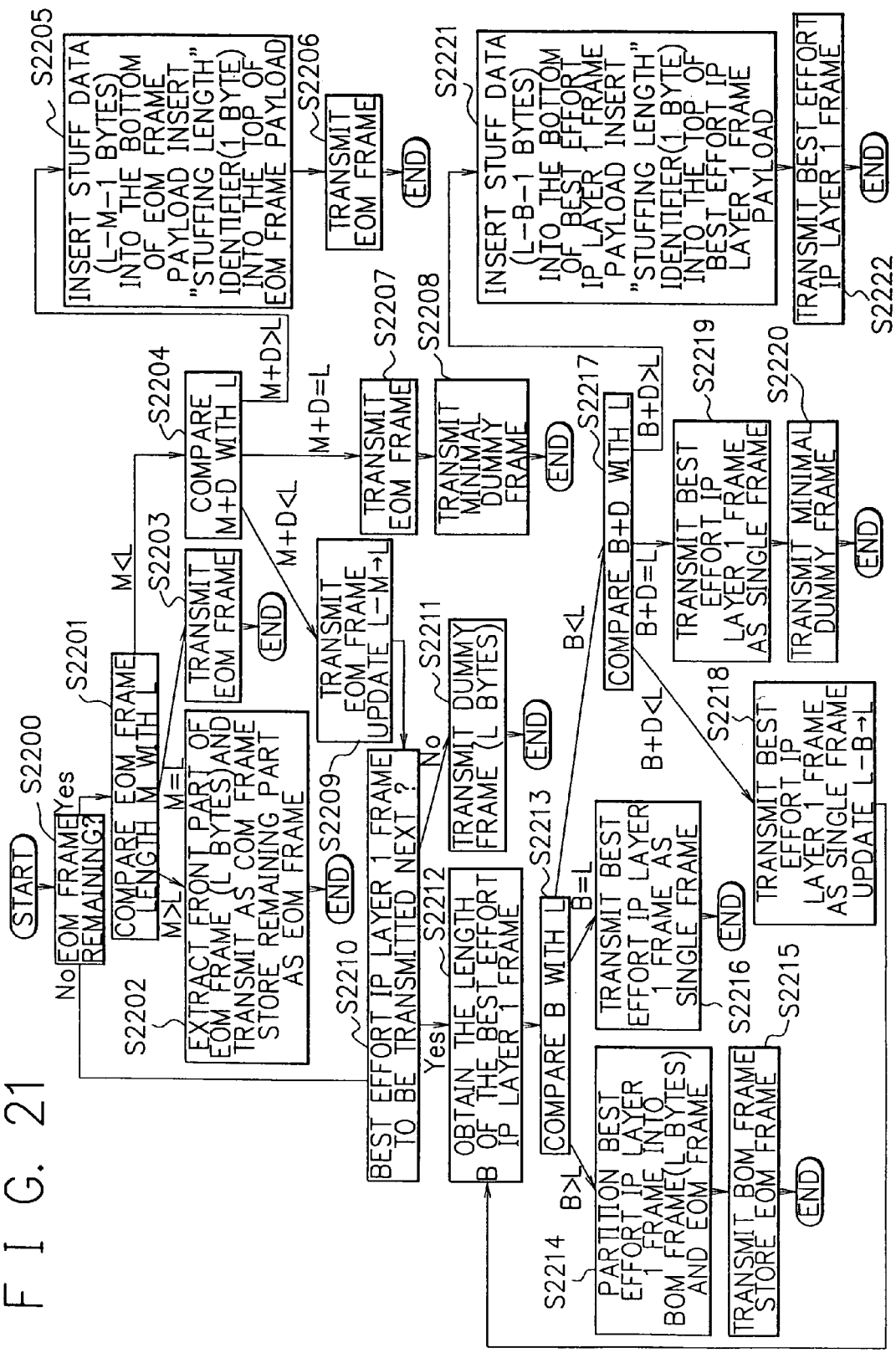
FIG. 21 is a flow chart showing an algorithm in accordance with the embodiment of the present invention for the transmission of best effort IP layer 1 frames.

FIG. 21 is a flow chart showing an algorithm in accordance with this embodiment for the transmission of the best effort IP layer 1 frames. Incidentally, the following explanation will be given ignoring the "Payload CRC" field for the sake of simplicity.

When a device at the transmitting end (hereafter, referred to as a "frame transmission device") received a best effort IP layer 1 frame transmission instruction and a parameter L indicating the length L of the best effort IP transfer space, the frame transmission device first judges whether or not a remaining EOM frame exists (step S2200). If a remaining EOM frame exists ("Yes" in the step S2200), the length M of the EOM frame is compared with the length L of the best effort IP transfer space (step S2201).

If the EOM frame length M is longer than the best effort IP transfer space length L ("M>L" in the step S2201), the EOM frame is partitioned and the first segment of the EOM frame is extracted. The length of the extracted first segment (including a header) is set to L. The extracted first segment of the EOM frame is transmitted as a COM frame, and the remaining segment of the EOM frame is stored as an EOM frame (having a layer 1 frame header) (step S2202), thereby the process is ended.

If the EOM frame length M is equal to the best effort IP transfer space length L ("M=L" in the step S2201), the EOM frame is transmitted without being partitioned (step S2203), thereby the process is ended.

If the EOM frame length M is shorter than the best effort IP transfer space length L ("M<L" in the step S2201), the EOM frame length M and the minimal dummy frame length D added together (M+D) is compared with the best effort IP transfer space length L (step S2204).

If the length M+D is equal to the best effort IP transfer space length L ("M+D=L" in the step S2204), the EOM frame of the length M is transmitted (step S2207) and thereafter the minimal dummy frame of the length D is transmitted (step S2208), thereby the process is ended.

If the length M+D is longer than the best effort IP transfer space length L ("M+D>L" in the step S2204), the stuff data is inserted after the payload of the EOM frame. The length of the stuff data is set to L−M−1 bytes. Incidentally, the 1 byte is used for the "Stuffing Length" identifier which indicates the length of the stuff data. Therefore, in the EOM frame to be transmitted, the "Stuffing Length" identifier (1 byte) is inserted at the top of the layer 1 frame payload and the stuff data (L−M−1 bytes) is inserted at the bottom of the layer 1 frame payload as shown in FIG. 7 (step S2205). Thereafter, the EOM frame is transmitted (step S2206), and thereby the process is ended.

If the length M+D is shorter than the best effort IP transfer space length L ("M+D<L" in the step S2204), the EOM frame is transmitted and the value of the parameter L (best effort IP transfer space length L) is updated into L−M (L−M→L) (step S2209).

If no remaining EOM frame exists ("No" in the step S2200) or if the update of the best effort IP transfer space length L has been conducted (step S2209), the frame transmission device judges whether a best effort IP layer 1 frame to be transferred next exists or not (step S2210).

If no best effort IP layer 1 frame to be transmitted next exists ("No" in the step S2210), a dummy frame of the length L is transmitted so as to implement the periodical transmission of the STM layer 1 frames (step S2211), thereby the process is ended.

If a best effort IP layer 1 frame to be transmitted next exists ("Yes" in the step S2210), the frame transmission device obtains the length B of the best effort IP layer 1 frame to be transmitted next (step S2212).

Subsequently, the best effort IP layer 1 frame length B is compared with the best effort IP transfer space length L (step S2213).

If the best effort IP layer 1 frame length B is longer than the best effort IP transfer space length L ("B>L" in the step S2213), the best effort IP layer 1 frame is partitioned into a BOM frame of the length L and an EOM frame (step S2214). Thereafter, the BOM frame of the length L is transmitted and the EOM frame (having a layer 1 frame header) is stored (step S2215), thereby the process is ended.

If the best effort IP layer 1 frame length B is equal to the best effort IP transfer space length L ("B=L" in the step S2213), the best effort IP layer 1 frame is transmitted as a single frame without being partitioned (step S2216), thereby the process is ended.

If the best effort IP layer 1 frame length B is shorter than the best effort IP transfer space length L ("B<L" in the step S2213), the best effort IP layer 1 frame length B and the minimal dummy frame length D added together (B+D) is compared with the best effort IP transfer space length L (step S2217).

If the length B+D is equal to the best effort IP transfer space length L ("B+D=L" in the step S2217), the best effort IP layer 1 frame of the length B is transmitted as a single frame (step S2219) and thereafter the minimal dummy frame of the length D is transmitted (step S2220), thereby the process is ended.

If the length B+D is longer than the best effort IP transfer space length L ("B+D>L" in the step S2217), the stuff data is inserted after the payload of the best effort IP layer 1 frame to be transmitted next. The length of the stuff data is set to L−B−1 bytes. The 1 byte is used for the "Stuffing Length" identifier indicating the length of the stuff data. Therefore, in the best effort IP layer 1 frame to be transmitted next, the "Stuffing Length" identifier (1 byte) is inserted at the top of the layer 1 frame payload and the stuff data (L−B−1 bytes) is inserted at the bottom of the layer 1 frame payload as shown in FIG. 7 (step S2221). Thereafter, the best effort IP layer 1 frame is transmitted as a single frame (step S2222), and thereby the process is ended.

If the length B+D is shorter than the best effort IP transfer space length L ("B+D<L" in the step S2217), the best effort IP layer 1 frame is transmitted as a single frame and the value of the parameter L (best effort IP transfer space length L) is updated into L−B (L−B→L) (step S2218). Thereafter, the process is returned to the step S2212.

By the processes which has been described above, the best effort IP transfer space of the length L is precisely filled up and thereby the periodical transmission of the STM layer 1 frames is realized successfully. Therefore, the STM signals can be transferred end-to-end through the packet-based network.

In the following, an explanation will be given on the layer 2 frame header in accordance with this embodiment referring to FIGS. 4C, 8B, 13 and 14.

In the case where an IP packet is transferred in a layer 2 frame, the layer 2 frame is provided with the aforementioned layer 2 frame header which is composed of the route label and the flow label, as shown in FIG. 4C.

The route label is a field which is referred to for the routing through nodes of the network. The flow label is a field which is used for designating one OCH (Optical CHannel) (transmission line and wavelength) to be used when there are two or more OCHs between two nodes.

As mentioned before, in the case of the best effort IP layer 1 frames, the route label and the flow label as the layer 2 frame header are added to the BOM frames only as shown in FIG. 8B, and are not added to the COM frames and the EOM frames as shown in FIG. 8C. FIGS. 13 and 14 show the transfer of IP layer 1 frames by use of the route label and the flow label. Details of frame transfer process using the route label and the flow label will be described later.

Figure 20:
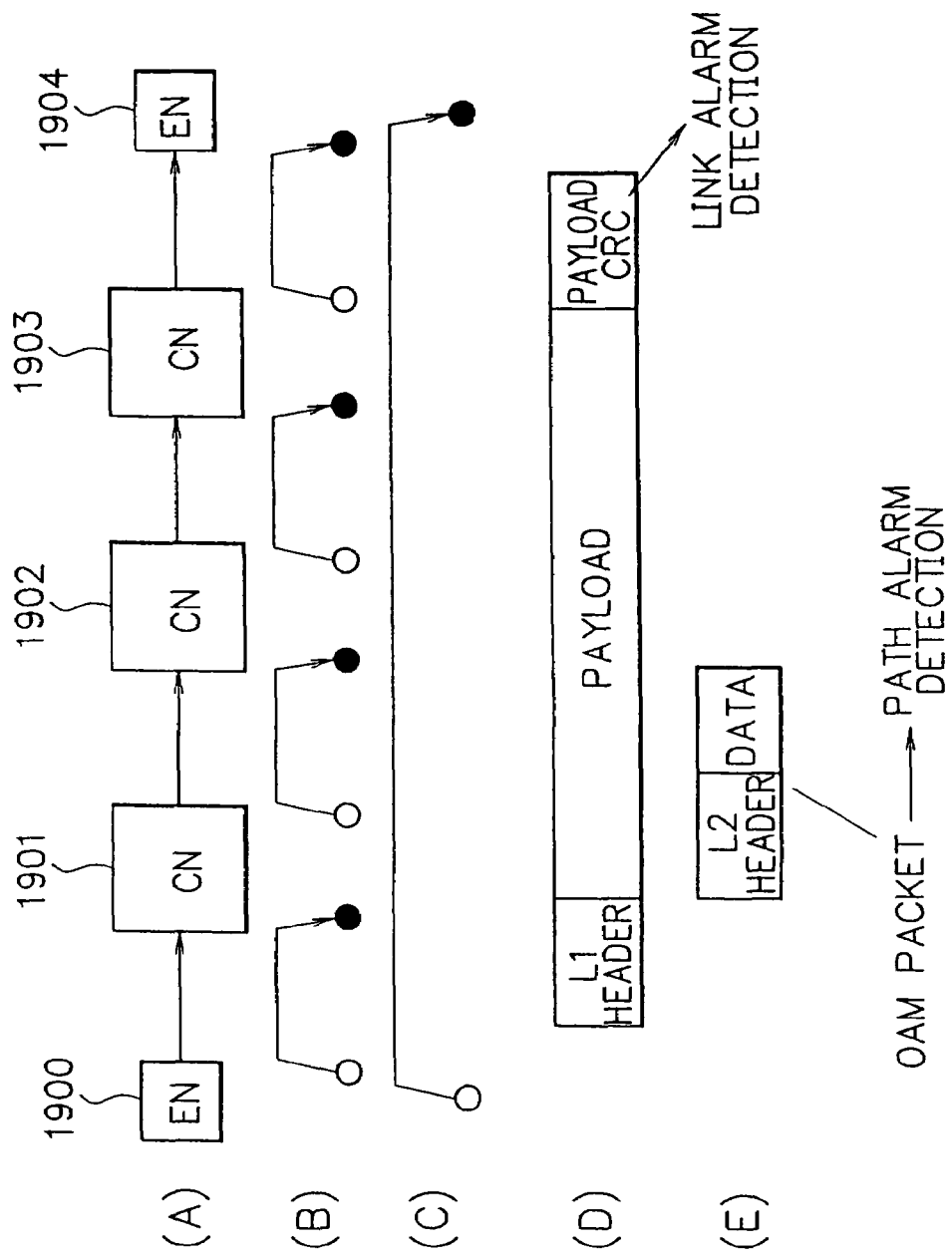
FIG. 20 is a schematic diagram showing link monitoring and path monitoring which are conducted in the embodiment of the present invention.

The "Payload CRC" field of the layer 1 frame can realize link quality monitoring (as shown in (B) and (D) of FIG. 20) but can not be used for path monitoring. Therefore, an OAM (Operating And Management) frame which is shown in FIG. 22C can be employed for the path monitoring between the ingress point and the egress point in the network as shown in (B) and (E) of FIG. 20. The path monitoring can be executed by filling the payload of the OAM frame shown in FIG. 22C with the so-called "PN pattern", for example. The OAM frames can be transferred at the ends of the fixed intervals (125 μsec). When the OAM frames are used, the best effort IP transfer space length L which was used in the flow chart of FIG. 21 is decreased by the length of the OAM frame.

As described above, in the frame construction method in accordance with the embodiment of the present invention, the STM layer 1 frames are transferred at fixed periods (125 μsec). Bit synchronization is established in the physical layer, and byte synchronization and frame synchronization are established by use of the "Header CRC16" identifier, thereby the STM signals are necessarily transferred at fixed intervals (125 μsec) maintaining the end-to-end circuit quality monitoring functions (end-to-end performance monitoring functions).

Further, the STM signals, the ATM cells and the IP packets are transferred by use of a common frame format, therefore, the different types of information can be handled and managed in a network concurrently by a common method.

Therefore, the STM networks, the ATM networks and the IP networks which have been constructed separately and independently can be integrated or constructed as a common or integrated network.

By the definition of the route label and the flow label as transfer information for the IP layer 2 frames, IP packets can be transferred appropriately by simple procedures even when each link is composed of two or more wavelengths by means of WDM (Wavelength Division Multiplexing). The details of the transfer of the IP layer 1 frames by use of the route label and the flow label will be described later.

In the following, a data transfer system for transferring a mixture of the STM traffic and the best effort traffic in accordance with the embodiment of the present invention will be explained in detail.

Figure 12:
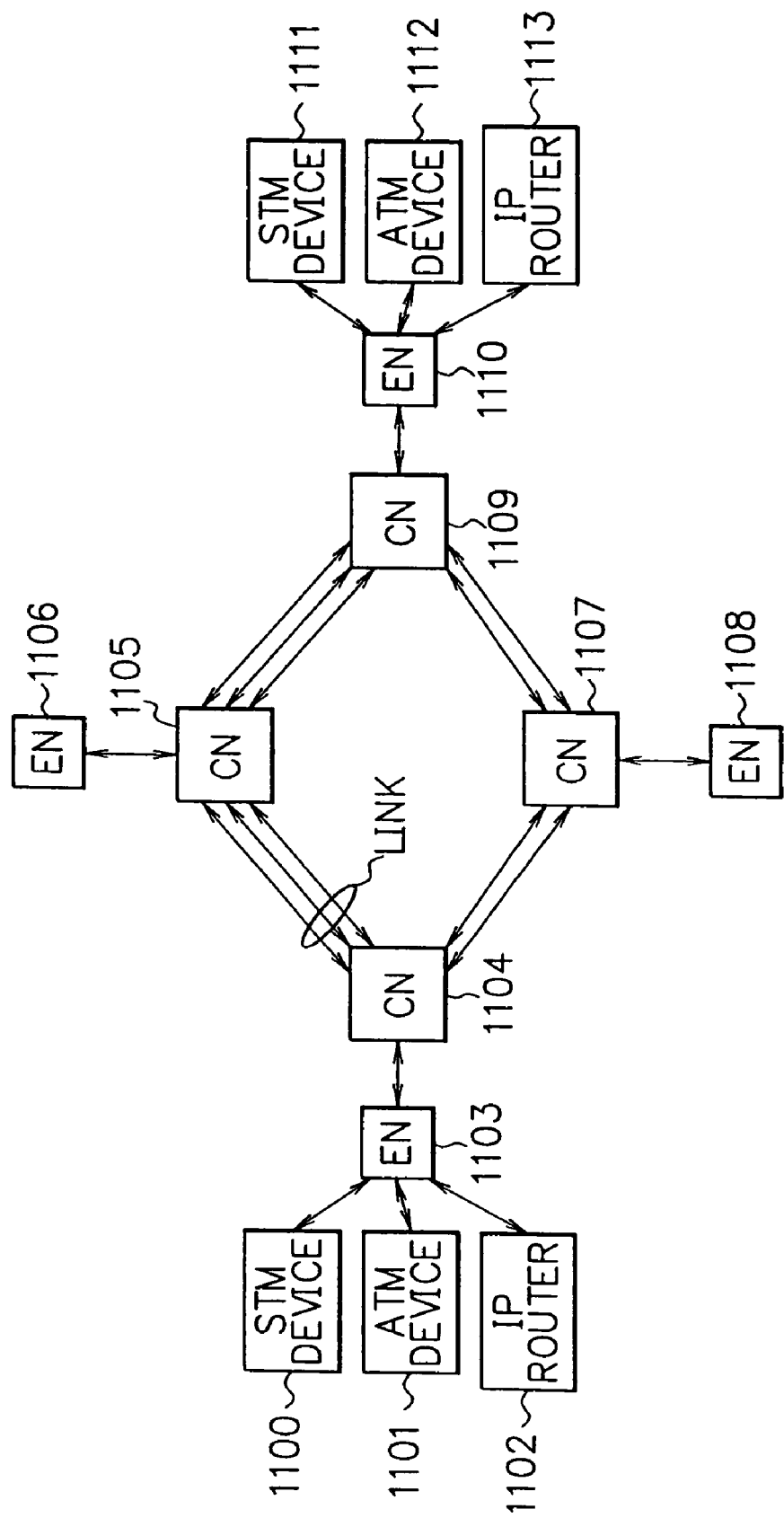
FIG. 12 is a schematic diagram showing an example of a network as a data transfer system in accordance with the embodiment of the present invention.

FIG. 12 is a schematic diagram showing an example of a network as a data transfer system in accordance with the embodiment of the present invention. The network shown in FIG. 12 includes STM devices (STM switch, STM transmission node, etc.) 1100 and 1111, ATM devices (ATM switch, ATM crossconnect, etc.) 1101 and 1112, IP routers 1102 and 1113, edge nodes (ENs) 1103, 1106, 1108 and 1110, and core nodes (CNs) 1104, 1105, 1107 and 1109.

The edge nodes 1103, 1106, 1108 and 1110 of the network are connected to conventional network devices such as the STM devices 1100 and 1111, the ATM devices 1101 and 1112, the IP routers 1102 and 1113, etc. Therefore, the edge nodes 1103, 1106, 1108 and 1110 operate as the interfaces of the network to conventional network devices.

The edge node (1103, 1106, 1108, 1110) packs STM signals, ATM cells and IP packets in layer 2 frames (in layer 1 frames) as shown in FIGS. 4A through 4C and transmits the layer 1 frames to the network.

Meanwhile, the edge node (1103, 1106, 1108, 1110) receives and terminates layer 1 frames which are transferred from the network and extracts STM signals, ATM cells and IP packets from the layer 1 frames. The extracted STM signals, ATM cells and IP packets are transmitted to the STM devices 1100 and 1111, the ATM devices 1101 and 1112, and the IP routers 1102 and 1113, respectively.

The core node (1104, 1105, 1107, 1109) terminates layer 1 frames and extracts layer 2 frames from the layer 1 frames. The core node (1104, 1105, 1107, 1109) executes switching of the layer 2 frames based on the header information of the extracted layer 2 frames. Thereafter, the core node (1104, 1105, 1107, 1109) converts the layer 2 frames into layer 1 frames and outputs the layer 1 frames to appropriate lines based on the header information.

FIG. 15 is a block diagram showing an example of the internal composition of a transmission section of the edge node (1103, 1106, 1108, 1110). In the following, the composition and the operation of the transmission section of the edge node (1103, 1106, 1108, 1110) will be described in detail referring to FIG. 15.

The transmission section of the edge node (1103, 1106, 1108, 1110) shown in FIG. 15 includes an IP packet reception section 1403, an ATM cell reception section 1404, an STM signal reception section 1405, a route label generation section 1406, a flow label generation section 1407, an IP layer 2 frame generation section 1408, an ATM layer 1 frame generation section 1409, an STM layer 1 frame generation section 1410, a timer 1411, an IP layer 1 frame generation section 1412, a scheduler section 1413 and a frame multiplexing section 1414.

The STM signal reception section 1405 receives STM signals from an STM device 1402 for assembling STM layer 2 frames. The STM signal, whose destination is recognized by provisioning, is an N-channel voice signal. The bit rate of each channel is set to 8 bit/125 μsec (64 Kbps), therefore, the bit rate of the STM signal becomes N×64 Kbps.

The STM signal reception section 1405 sends the STM signals to the STM layer 1 frame generation section 1410. The STM layer 1 frame generation section 1410 first generates STM layer 2 frames by forming STM layer 2 frame payloads collecting the STM signals in units of 125 μsec and adding a layer 2 frame header including a route label to each STM layer 2 frame payload, and thereafter generates STM layer 1 frames by adding "Packet Length" identifiers (indicating the length of the STM layer 1 frame payload), "Priority" identifiers (indicating CBR (Constant Bit Rate) data transfer), "Protocol" identifiers (indicating STM), "Frame Mode" identifiers (indicating "Single Frame") and "Stuff" identifiers (indicating "No Stuffing") to the STM layer 2 frames. Incidentally, the route label of the STM layer 2 frame is generated by the STM layer 1 frame generation section 1410 by provisioning. Concretely, STM frames containing the STM signals are supplied from the STM device 1402, and the destination of each STM signal is judged based on the position of a time slot (containing the STM signal) in the STM frame. The STM layer 2 frame is generated by collecting STM signals for the same destination, and a route label corresponding to the destination is provided to the STM layer 2 frame header, for example.

Subsequently, the STM layer 1 frame generation section 1410 conducts the CRC16 operation to the header of the generated STM layer 1 frame and adds the result to the bottom of the STM layer 1 frame header. Further, as an option, the STM layer 1 frame generation section 1410 conducts the CRC16 or CRC32 to the layer 1 frame payload and adds the result to the rear end of the STM layer 1 frame.

The ATM cell reception section 1404 receives ATM cells from an ATM device 1401 for assembling ATM layer 2 frames and stores the ATM cells in the ATM layer 1 frame generation section 1409.

The ATM layer 1 frame generation section 1409 first generates ATM layer 2 frames by forming ATM layer 2 frame payloads by use of the stored ATM cells and adding a layer 2 frame header including a route label to each ATM layer 2 frame payload, and thereafter generates ATM layer 1 frames by adding "Packet Length" identifiers (indicating the length of the ATM layer 1 frame payload), "Priority" identifiers (indicating types of the ATM (CBR (Constant Bit Rate), UBR (Unspecified Bit Rate), etc.)), "Protocol" identifiers (indicating ATM), "Frame Mode" identifiers (indicating "Single Frame") and "Stuff" identifiers (indicating "No Stuffing") to the ATM layer 2 frames. Incidentally, the route label of the ATM layer 2 frame is generated by the ATM layer 1 frame generation section 1409 based on the VPI/VCI of the ATM cell header, for example.

Subsequently, the ATM layer 1 frame generation section 1409 conducts the CRC16 operation to the header of the generated ATM layer 1 frame and adds the result to the bottom of the ATM layer 1 frame header. Further, as an option, the ATM layer 1 frame generation section 1409 conducts the CRC16 or CRC32 to the layer 1 frame payload and adds the result to the rear end of the ATM layer 1 frame.

The IP packet reception section 1403 receives IP packets from an IP router 1400 for assembling IP layer 2 frames and stores the IP packets in the IP layer 2 frame generation section 1408. Meanwhile, header information of the IP packets is sent to the route label generation section 1406 and the flow label generation section 1407.

The route label generation section 1406 generates a route label based on the destination IP address or based on the destination IP address and the source IP address which are contained in the IP packet header, and sends the result (route label) to the IP layer 2 frame generation section 1408.

The flow label generation section 1407 generates a flow label based on the header information of the IP packet and sends the generated flow label to the IP layer 2 frame generation section 1408.

The IP layer 2 frame generation section 1408 generates IP layer 2 frames by use of the IP packets, the route labels and the flow labels. The generated IP layer 2 frames are sent to the IP layer 1 frame generation section 1412 and stored therein.

The IP layer 1 frame generation section 1412 separates the stored IP layer 2 frames into primary IP layer 2 frames and best effort IP layer 2 frames. Whether an IP layer 2 frame is a primary IP layer 2 frame or a best effort IP layer 2 frame can be determined by referring to the COS (Class Of Service) identifier of the IP packet header, or by judging whether or not the IP packet header includes registered IP address information concerning primary IP, for example. The IP layer 1 frame generation section 1412 generates primary IP layer 1 frames and best effort IP layer 1 frames by use of the primary IP layer 2 frames and the best effort IP layer 2 frames respectively, and outputs the primary IP layer 1 frames to the frame multiplexing section 1414 with higher priority than the best effort IP layer 1 frames.

The IP layer 1 frame generation section 1412 partitions the best effort IP layer 1 frame into the BOM frame, the COM frames and the EOM frame according to the method which has been described referring to the flow chart of FIG. 21. The IP layer 1 frame generation section 1412 inserts the stuff data to the best effort IP layer 1 frame if necessary according to the above method.

The judgment on whether the best effort IP layer 1 frame should be transmitted as a single frame or should be partitioned into a BOM frame, COM frames and an EOM frame, and the judgment on whether the stuff data should be inserted or not are conducted depending on the length L of the best effort IP transfer space, as explained referring to the flow chart of FIG. 21.

The IP layer 1 frame generation section 1412 generates a "Packet Length" identifier (indicating the length of the best effort IP layer 1 frame payload), a "Priority" identifier (indicating low priority), a "Protocol" identifier (indicating IP), a "Frame Mode" identifier (indicating a single frame, a BOM frame, a COM frame or an EOM frame) and a "Stuff" identifier (indicating whether or not stuff data exists) as the best effort IP layer 1 frame header.

Subsequently, the IP layer 1 frame generation section 1412 conducts the CRC16 operation to the generated best effort IP layer 1 frame header and adds the result ("Header CRC16" identifier) to the bottom of the best effort IP layer 1 frame header.

In the case where the stuff data is inserted in the best effort IP layer 1 frame, the IP layer 1 frame generation section 1412 adds the "Stuffing Length" identifier (indicating the length of the stuff data) after the "Header CRC16" identifier and inserts the stuff data at the bottom of the best effort IP layer 1 frame payload as shown in FIG. 7.

Further, as an option, the IP layer 1 frame generation section 1412 conducts the CRC16 or CRC32 to the best effort IP layer 1 frame payload and adds the result to the rear end of the best effort IP layer 1 frame.

The best effort IP layer 1 frames generated by the IP layer 1 frame generation section 1412 is outputted to the frame multiplexing section 1414 with lower priority than the primary IP layer 1 frames. Incidentally, for the primary IP layer 1 frames, the IP layer 1 frame generation section 1412 generates a "Packet Length" identifier (indicating the length of the primary IP layer 1 frame payload), a "Priority" identifier (indicating high priority), a "Protocol" identifier (indicating IP), a "Frame Mode" identifier (indicating a single frame), a "Stuff" identifier (indicating "No Stuffing") and a "Header CRC16" identifier. The primary IP layer 1 frames as single frames are outputted to the frame multiplexing section 1414 with higher priority than the best effort IP layer 1 frames.

The scheduler section 1413 instructs the STM layer 1 frame generation section 1410 to output an STM layer 1 frame to the frame multiplexing section 1414 periodically (125 μsec) based on internal time which is clocked by the timer 1411.

After letting the STM layer 1 frame generation section 1410 output the STM layer 1 frame to the frame multiplexing section 1414, the scheduler section 1413 instructs the ATM layer 1 frame generation section 1409 to output one or more ATM layer 1 frames stored therein to the frame multiplexing section 1414.

After letting the ATM layer 1 frame generation section 1409 output the ATM layer 1 frames to the frame multiplexing section 1414, the scheduler section 1413 instructs the IP layer 1 frame generation section 1412 to output one or more primary IP layer 1 frames stored therein to the frame multiplexing section 1414 as single frames.

After letting the IP layer 1 frame generation section 1412 output the primary IP layer 1 frames to the frame multiplexing section 1414, the scheduler section 1413 instructs the IP layer 1 frame generation section 1412 to output a best effort IP layer 1 frame stored therein to the frame multiplexing section 1414 as a single frame, a BOM frame, a COM frame or an EOM frame. The IP layer 1 frame generation section 1412 outputs one or more best effort IP layer 1 frames according to the algorithm which has been explained referring to the flow chart of FIG. 21.

The frame multiplexing section 1414 receives the STM layer 1 frames, the ATM layer 1 frames, the primary IP layer 1 frames and the best effort IP layer 1 frames which are supplied from the STM layer 1 frame generation section 1410, the ATM layer 1 frame generation section 1409 and the IP layer 1 frame generation section 1412 according to the instructions of the scheduler section 1413, and frame multiplexes the layer 1 frames as shown in FIGS. 10 and 11. The frame-multiplexed layer 1 frames are outputted by the frame multiplexing section 1414 to a transmission line (to a core node (1104, 1105, 1107, 1109)).

Figure 16:
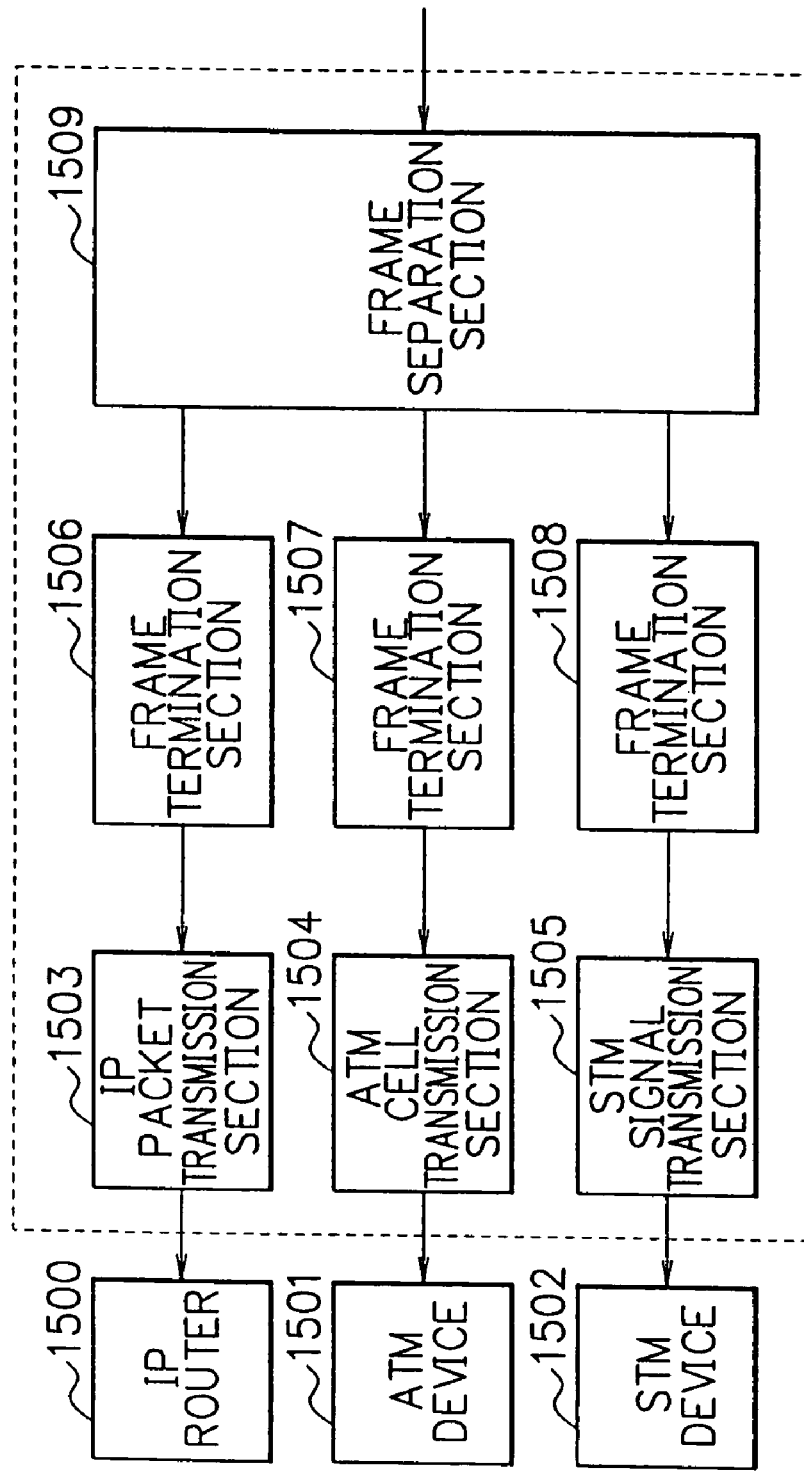
FIG. 16 is a block diagram showing an example of the internal composition of a reception section of the edge node.

FIG. 16 is a block diagram showing an example of the internal composition of a reception section of the edge node (1103, 1106, 1108, 1110). In the following, the composition and the operation of the reception section of the edge node (1103, 1106, 1108, 1110) will be described in detail referring to FIG. 16.

The reception section of the edge node (1103, 1106, 1108, 1110) shown in FIG. 16 includes an IP packet transmission section 1503, an ATM cell transmission section 1504, an STM signal transmission section 1505, frame termination sections 1506, 1507 and 1508, and a frame separation section 1509.

The frame separation section 1509 establishes bit synchronization, byte synchronization and frame synchronization by use of the layer 1 frame headers.

After establishing the bit synchronization, the byte synchronization and the frame synchronization, the frame separation section 1509 refers to the "Protocol" identifier contained in the header of a layer 1 frame and thereby judges whether the data contained in the payload of the layer 1 frame is an STM signal, an ATM cell or an IP packet.

Subsequently, the frame separation section 1509 refers to the "Packet Length" identifier of the layer 1 frame header and thereby grasps the total length and the rear end of the layer 1 frame payload.

When the layer 1 frame is an STM layer 1 frame, the frame separation section 1509 sends the STM layer 1 frame to the frame termination section 1508. When the layer 1 frame is an ATM layer 1 frame, the frame separation section 1509 sends the ATM layer 1 frame to the frame termination section 1507. When the layer 1 frame is an IP layer 1 frame, the frame separation section 1509 sends the IP layer 1 frame to the frame termination section 1506.

The frame termination section 1508 extracts STM signals from the layer 1 frames and sends the extracted STM signals to the STM signal transmission section 1505. The STM signal transmission section 1505 transmits the STM signals to an STM device 1502.

The frame termination section 1507 extracts ATM cells from the layer 1 frames and sends the extracted ATM cells to the ATM cell transmission section 1504. The ATM cell transmission section 1504 transmits the ATM cells to an ATM device 1501.

The frame termination section 1506 extracts an IP layer 2 frame from the IP layer 1 frame if the IP layer 1 frame is a single frame. If the stuff data has been inserted in the IP layer 2 frame, the frame termination section 1506 removes the stuff data from the IP layer 2 frame. Subsequently, the termination section 1506 extracts an IP packet from the IP layer 2 frame and sends the extracted IP packet to the IP packet transmission section 1503. The IP packet transmission section 1503 transmits the IP packet to an IP router 1500.

If the layer 1 frame is a BOM frame or a COM frame, the frame termination section 1506 stores the BOM/COM frame until an EOM frame is supplied from the frame separation section 1509. When the EOM frame is supplied from the frame separation section 1509, the frame termination section 1506 reconstructs a layer 2 frame by connecting the payloads of the BOM frame, the COM frames and the EOM frame. In the reconstruction of the layer 2 frame, the frame termination section 1506 judges whether or not the stuff data has been inserted in each of the layer 1 frames. If the stuff data has been inserted in a layer 1 frame, the frame termination section 1506 removes the stuff data from the layer 1 frame.

Subsequently, the frame termination section 1506 extracts an IP packet from the reconstructed layer 2 frame and sends the extracted IP packet to the IP packet transmission section 1503. The IP packet transmission section 1503 transmits the IP packet to the IP router 1500.

FIG. 17 is a block diagram showing an example of the internal composition of the core node (1104, 1105, 1107, 1109). In the following, the composition and the operation of the core node (1104, 1105, 1107, 1109) will be described in detail referring to FIG. 17.

The core node (1104, 1105, 1107, 1109) shown in FIG. 17 includes reception sections 1600 and 1601, a layer 2 frame switch 1602, and transmission sections 1603 and 1604.

The reception section (1600, 1601) establishes byte synchronization and frame synchronization with regard to each input line by use of the "Header CRC16" identifiers in the layer 1 frame headers.

The layer 2 frame switch 1602 determines an appropriate output line (output port) for each frame based on the label information of the layer 2 frame header and thereby conducts frame switching. The transmission section (1603, 1604) reconstructs layer 1 frames for the transmission of the layer 2 frames into the appropriate output line.

Figure 18:
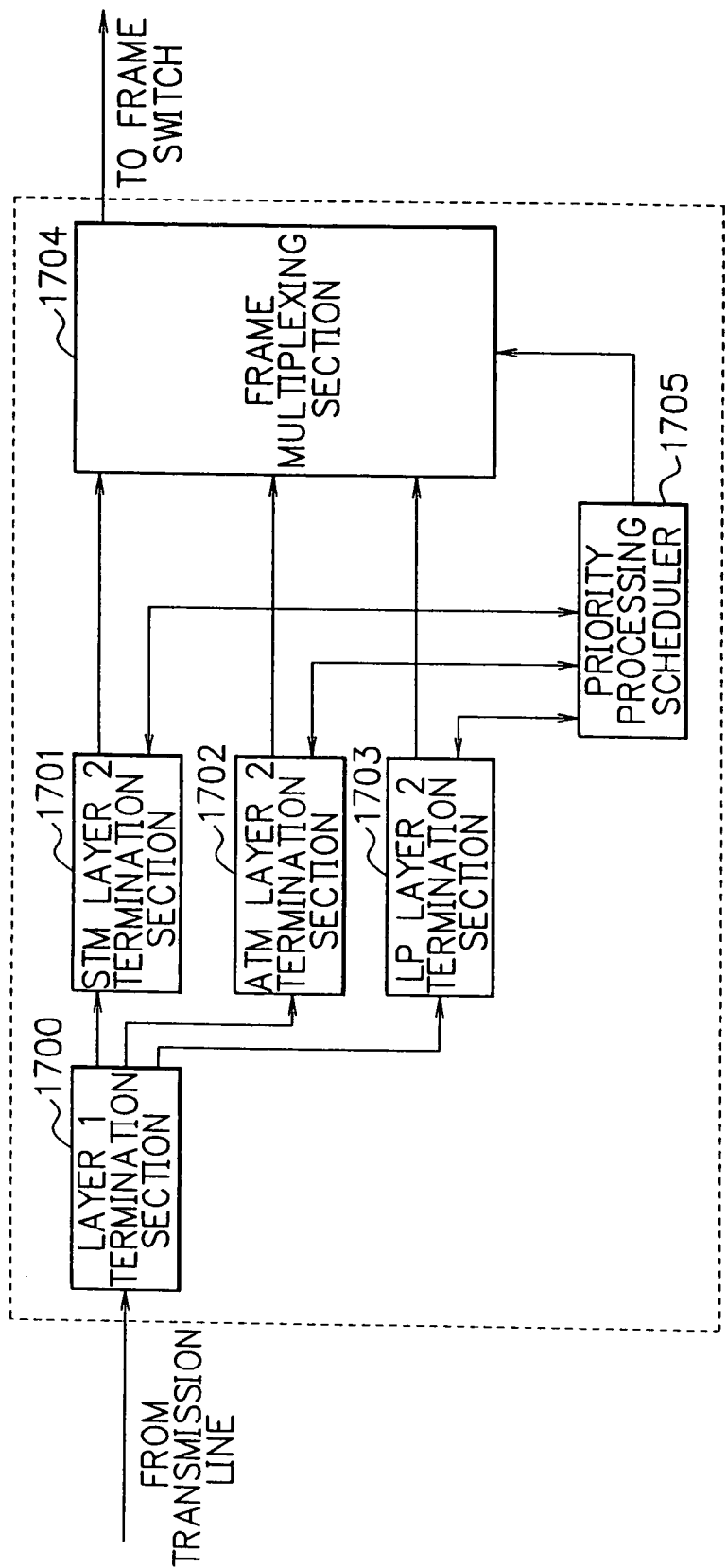
FIG. 18 is a block diagram showing an example of the internal composition of a reception section of the core node.

FIG. 18 is a block diagram showing an example of the internal composition of the reception section (1600, 1601) of the core node (1104, 1105, 1107, 1109). In the following, the composition and the operation of the reception section (1600, 1601) of the core node (1104, 1105, 1107, 1109) will be described in detail referring to FIG. 18.

The reception section (1600, 1601) of the core node (1104, 1105, 1107, 1109) shown in FIG. 18 includes a layer 1 termination section 1700, an STM layer 2 termination section 1701, an ATM layer 2 termination section 1702, an IP layer 2 termination section 1703, a frame multiplexing section 1704 and a priority processing scheduler 1705.

The layer 1 termination section 1700 terminates layer 1 frames which are supplied from a transmission line. The layer 1 termination section 1700 determines the type (STM, ATM or IP packet) of the layer 1 frame based on the "Protocol" identifier in the layer 1 frame header, and sends the layer 1 frame to the STM layer 2 termination section 1701, the ATM layer 2 termination section 1702 or the IP layer 2 termination section 1703 depending on the type of the layer 1 frame.

The STM layer 2 termination section 1701 extracts an STM layer 2 frame from the STM layer 1 frame supplied from the layer 1 termination section 1700. In the same way, the ATM layer 2 termination section 1702 extracts an ATM layer 2 frame from the ATM layer 1 frame supplied from the layer 1 termination section 1700.

The IP layer 2 termination section 1703 extracts an IP layer 2 frame from the IP layer 1 frame supplied from the layer 1 termination section 1700 if the IP layer 1 frame is a single frame. If the IP layer 1 frame is a BOM frame or a COM frame, the IP layer 2 termination section 1703 stores the BOM/COM frame until an EOM frame is supplied from the layer 1 termination section 1700.

When the EOM frame is supplied from the layer 1 termination section 1700, the IP layer 2 termination section 1703 reconstructs an IP layer 2 frame by connecting the payloads of the BOM frame, the COM frames and the EOM frame.

In the extraction of the IP layer 2 frame from the IP layer 1 frame, the IP layer 2 termination section 1703 refers to the "Stuff" identifier of the IP layer 1 frame header and thereby judges whether or not the stuff data has been inserted in the IP layer 1 frame. If the stuff data has been inserted in the IP layer 1 frame, the IP layer 2 termination section 1703 removes the stuff data (of a length which is described in the "Stuffing Length" identifier) from the payload of the IP layer 1 frame.

The priority processing scheduler 1705 grasps the presence or absence of layer 2 frames stored in the STM layer 2 termination section 1701, the ATM layer 2 termination section 1702 and the IP layer 2 termination section 1703 and conducts the management of priority processing.

If an STM layer 2 frame, to be handled with the highest priority, exists in the STM layer 2 termination section 1701, the priority processing scheduler 1705 instructs the frame multiplexing section 1704 to read out the STM layer 2 frame with the highest priority.

Thereafter, if one or more ATM layer 2 frames, to be handled with the second priority, exist in the ATM layer 2 termination section 1702, the priority processing scheduler 1705 instructs the frame multiplexing section 1704 to read out the ATM layer 2 frames.

Thereafter, if one or more primary layer 2 frames, to be handled with the third priority, exist in the IP layer 2 termination section 1703, the priority processing scheduler 1705 instructs the frame multiplexing section 1704 to read out the primary IP layer 2 frames from the IP layer 2 termination section 1703 if no ATM layer 2 frame exists in the ATM layer 2 termination section 1702.

The best effort IP layer 2 frame is a layer 2 frame of the lowest priority, therefore, the priority processing scheduler 1705 instructs the frame multiplexing section 1704 to read out the best effort IP layer 2 frames from the IP layer 2 termination section 1703 only when there is no STM layer 2 frame, ATM layer 2 frame nor primary IP layer 2 frame in the reception section (1600, 1601).

The frame multiplexing section 1704 reads out the layer 2 frames from the STM layer 2 termination section 1701, the ATM layer 2 termination section 1702 and the IP layer 2 termination section 1703 according to the instructions of the priority processing scheduler 1705 and sends the layer 2 frames to the layer 2 frame switch 1602.

Figure 19:
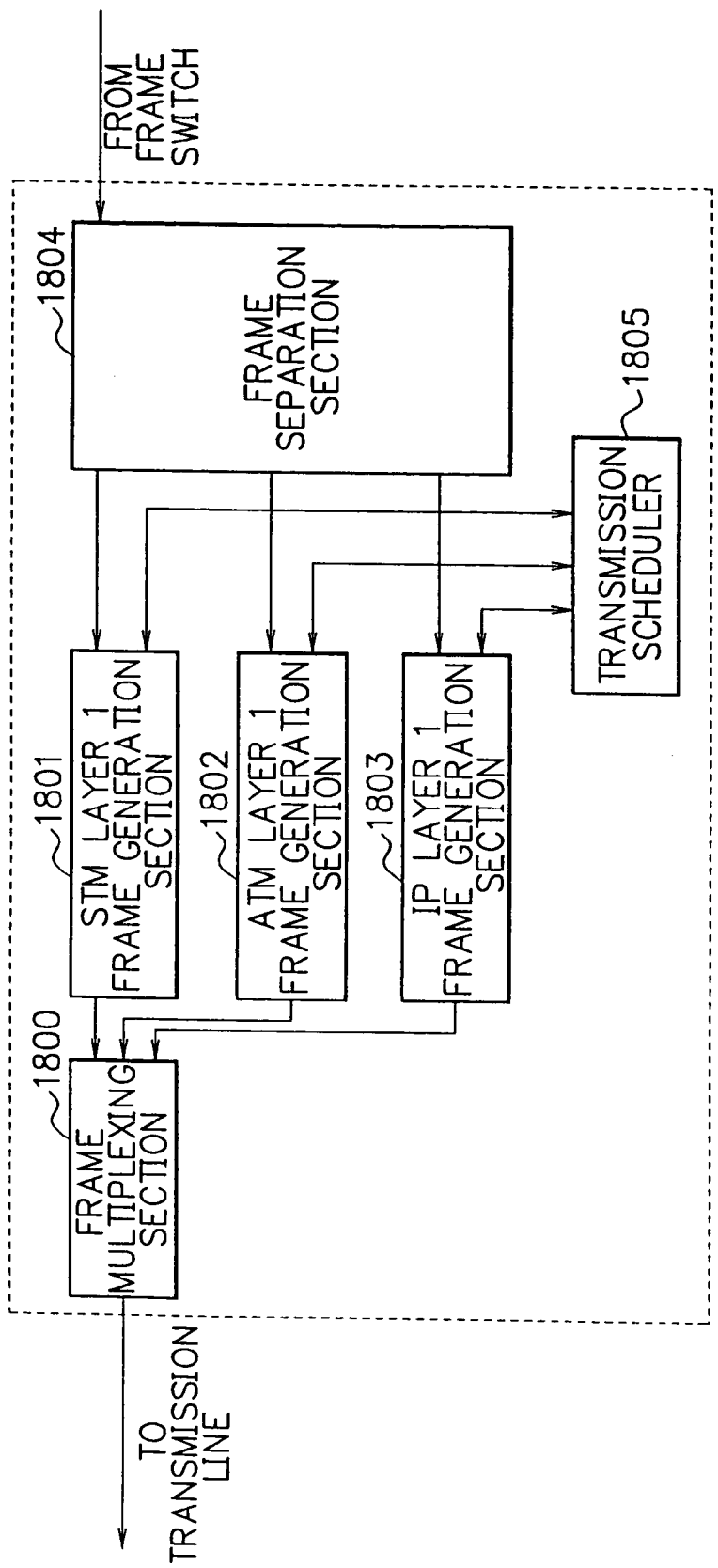
FIG. 19 is a block diagram showing an example of the internal composition of a transmission section of the core node.

FIG. 19 is a block diagram showing an example of the internal composition of the transmission section (1603, 1604) of the core node (1104, 1105, 1107, 1109). In the following, the composition and the operation of the transmission section (1603, 1604) of the core node (1104, 1105, 1107, 1109) will be described in detail referring to FIG. 19.

The transmission section (1603, 1604) of the core node (1104, 1105, 1107, 1109) shown in FIG. 19 includes a frame multiplexing section 1800, an STM layer 1 frame generation section 1801, an ATM layer 1 frame generation section 1802, an IP layer 1 frame generation section 1803, a frame separation section 1804 and a transmission scheduler 1805.

The frame separation section 1804 receives the layer 2 frame from the layer 2 frame switch 1602 and sends the layer 2 frame to the STM layer 1 frame generation section 1801, the ATM layer 1 frame generation section 1802 or the IP layer 1 frame generation section 1803 depending on the protocol (STM, ATM, IP, etc.) of the layer 2 frame. Incidentally, information concerning the protocol of each layer 2 frame is supplied from the reception section (1600, 1601) via the layer 2 frame switch 1602 as control information. The control information can be transferred in the core node (1104, 1105, 1107, 1109) by multiplexing with the layer 2 frames.

The transmission scheduler 1805 grasps the presence or absence of layer 2 frames stored in the STM layer 1 frame generation section 1801, the ATM layer 1 frame generation section 1802 and the IP layer 1 frame generation section 1803 and conducts the management of priority processing.

The transmission scheduler 1805 instructs the STM layer 1 frame generation section 1801 to output an STM layer 1 frame periodically (125 μsec).

The STM layer 1 frame generation section 1801 converts the stored STM layer 2 frame into an STM layer 1 frame and sends the STM layer 1 frame to the frame multiplexing section 1800. Incidentally, information necessary for generating the layer 1 frame header can be transferred in the core node (1104, 1105, 1107, 1109) as the aforementioned control information.

In the conversion from the STM layer 2 frame to the STM layer 1 frame, the STM layer 1 frame generation section 1801 inserts the STM layer 2 frame in the payload of the STM layer 1 frame and inserts a "Packet Length" identifier, a "Priority" identifier (indicating CBR (Constant Bit Rate) data transfer), a "Protocol" identifier (indicating STM), a "Frame Mode" identifier (indicating "Single Frame") and a "Stuff" identifier (indicating "No Stuffing") in the header of the STM layer 1 frame. The STM layer 1 frame generation section 1801 conducts CRC16 operation to the above STM layer 1 frame header and adds the result to the bottom of the STM layer 1 frame header. Further, as an option, the STM layer 1 frame generation section 1801 conducts the CRC16 or CRC32 to the STM layer 1 frame payload and adds the result to the rear end of the STM layer 1 frame.

The ATM layer 1 frame generation section 1802 converts the stored ATM layer 2 frame into an ATM layer 1 frame by inserting the ATM layer 2 frame in the payload of the ATM layer 1 frame and inserting a "Packet Length" identifier, a "Priority" identifier (indicating the type of ATM (CBR, UBR, etc.)), a "Protocol" identifier (indicating ATM), a "Frame Mode" identifier (indicating "Single Frame") and a "Stuff" identifier (indicating "No Stuffing") in the header of the ATM layer 1 frame. The ATM layer 1 frame generation section 1802 conducts CRC16 operation to the above ATM layer 1 frame header and adds the result to the bottom of the ATM layer 1 frame header. Further, as an option, the ATM layer 1 frame generation section 1802 conducts the CRC16 or CRC32 to the ATM layer 1 frame payload and adds the result to the rear end of the ATM layer 1 frame.

The IP layer 1 frame generation section 1803 separates the IP layer 2 frames into primary IP layer 2 frames and best effort IP layer 2 frames, generates primary IP layer 1 frames and best effort IP layer 1 frames by use of the primary IP layer 2 frames and the best effort IP layer 2 frames respectively, and outputs the primary IP layer 1 frames and the best effort IP layer 1 frames to the frame multiplexing section 1800 giving higher priority to the primary IP layer 1 frames.

The IP layer 1 frame generation section 1803 partitions the best effort IP layer 1 frame (or the best effort IP layer 2 frame) into segments and distributes to a BOM frame, COM frames and an EOM frame if necessary according to the method which has been described referring to FIG. 21. The IP layer 1 frame generation section 1803 inserts the stuff data to the best effort IP layer 1 frame if necessary according to the above method.

The judgment on whether the best effort IP layer 1 frame should be transmitted as a single frame or should be partitioned into a BOM frame, COM frames and an EOM frame, and the judgment on whether the stuff data should be inserted or not are conducted depending on the length L of the best effort IP transfer space, as explained referring to FIG. 21.

The IP layer 1 frame generation section 1803 generates a "Packet Length" identifier (indicating the length of the best effort IP layer 1 frame payload), a "Priority" identifier (indicating low priority), a "Protocol" identifier (indicating IP), a "Frame Mode" identifier (indicating a single frame, a BOM frame, a COM frame or an EOM frame) and a "Stuff" identifier (indicating whether or not stuff data exists) as the best effort IP layer 1 frame header.

Subsequently, the IP layer 1 frame generation section 1803 conducts the CRC16 operation to the generated best effort IP layer 1 frame header and adds the result ("Header CRC16" identifier) to the bottom of the best effort IP layer 1 frame header.

In the case where the stuff data is inserted in the best effort IP layer 1 frame, the IP layer 1 frame generation section 1803 adds the "Stuffing Length" identifier (indicating the length of the stuff data) after the "Header CRC16" identifier and inserts the stuff data at the bottom of the best effort IP layer 1 frame payload as shown in FIG. 7.

Further, as an option, the IP layer 1 frame generation section 1803 conducts the CRC16 or CRC32 to the best effort IP layer 1 frame payload and adds the result to the rear end of the best effort IP layer 1 frame.

The best effort IP layer 1 frames generated by the IP layer 1 frame generation section 1803 is outputted to the frame multiplexing section 1800 with lower priority than the primary IP layer 1 frames. Incidentally, for the primary IP layer 1 frames, the IP layer 1 frame generation section 1803 generates a "Packet Length" identifier (indicating the length of the primary IP layer 1 frame payload), a "Priority" identifier (indicating high priority), a "Protocol" identifier (indicating IP), a "Frame Mode" identifier (indicating a single frame), a "Stuff" identifier (indicating "No Stuffing") and a "Header CRC16" identifier. The primary IP layer 1 frames as single frames are outputted to the frame multiplexing section 1800 with higher priority than the best effort IP layer 1 frames.

The transmission scheduler 1805 instructs the STM layer 1 frame generation section 1801 to output an STM layer 1 frame to the frame multiplexing section 1800 periodically (125 μsec).

After letting the STM layer 1 frame generation section 1801 output the STM layer 1 frame to the frame multiplexing section 1800, the transmission scheduler 1805 instructs the ATM layer 1 frame generation section 1801 to output one or more ATM layer 1 frames stored therein to the frame multiplexing section 1414.

After letting the ATM layer 1 frame generation section 1802 output the ATM layer 1 frames to the frame multiplexing section 1800, the transmission scheduler 1805 instructs the IP layer 1 frame generation section 1803 to output one or more primary IP layer 1 frames stored therein to the frame multiplexing section 1800 as single frames.

After letting the IP layer 1 frame generation section 1803 output the primary IP layer 1 frames to the frame multiplexing section 1800, the transmission scheduler 1805 instructs the IP layer 1 frame generation section 1803 to output a best effort IP layer 1 frame stored therein to the frame multiplexing section 1800 as a single frame, a BOM frame, a COM frame or an EOM frame. The IP layer 1 frame generation section 1803 outputs one or more best effort IP layer 1 frames according to the algorithm which has been explained referring to the flow chart of FIG. 21.

The frame multiplexing section 1800 receives the STM layer 1 frames, the ATM layer 1 frames, the primary IP layer 1 frames and the best effort IP layer 1 frames supplied from the STM layer 1 frame generation section 1801, the ATM layer 1 frame generation section 1802 and the IP layer 1 frame generation section 1803, and frame multiplexes the layer 1 frames as shown in FIGS. 10 and 11. The frame-multiplexed layer 1 frames are outputted by the frame multiplexing section 1800 to a transmission line.

FIG. 20 is a schematic diagram showing link monitoring and path monitoring which are conducted in this embodiment. FIG. 20 shows an example of frame transfer between edge nodes 1900 and 1904 via core nodes 1901, 1902 and 1903.

As shown (B) of FIG. 20, link monitoring with regard to each link between two nodes is conducted by each node (1901, 1902, 1903, 1904) by referring to the "Payload CRC" field of each layer 1 frame which is shown in (D) of FIG. 20.

As shown (C) of FIG. 20, path monitoring with regard to a path from the ingress point to the egress point can be conducted by the edge node 1904 at the egress point by referring to the OAM frame which is shown in (E) of FIG. 20 (see FIG. 22C). As mentioned before, the so-called PN pattern can be packed in the payload of the OAM frame, for example.

As described above, in the data transfer system and the frame construction devices in accordance with the embodiment of the present invention, the STM layer 1 frames are transferred at fixed periods (125 μsec). Bit synchronization is established in the physical layer, and byte synchronization and frame synchronization are established by use of the "Header CRC16" identifier, thereby the STM signals are necessarily transferred at fixed intervals (125 μsec) maintaining the end-to-end circuit quality monitoring functions (end-to-end performance monitoring functions).

Further, the STM signals, the ATM cells and the IP packets are transferred by use of a common frame format, therefore, the different types of information can be handled and managed in a network concurrently by a common method.

Especially, the core node (1104, 1105, 1107, 1109) establishes the bit synchronization, the byte synchronization and the frame synchronization by referring to the layer 1 frame headers, and the STM layer 1 frames, the ATM layer 1 frames and the IP layer 1 frames are outputted to appropriate output lines by use of the layer 2 frame switch 1602.

Therefore, the STM networks, the ATM networks and the IP networks which have been constructed separately and independently can be integrated or constructed as a common or integrated network.

By the definition of the route label and the flow label as transfer information for the IP layer 2 frames, IP packets can be transferred appropriately by simple procedures even when each link is composed of two or more wavelengths by means of WDM (Wavelength Division Multiplexing).

In the following, the operation of the data transfer system in accordance with the embodiment of the present invention for transferring a mixture of the STM traffic and the best effort traffic will be explained more in detail.

First, the transfer of STM signals in the data transfer system of FIG. 12 will be explained in detail.

Referring to FIG. 15, in the transmission section of the edge node 1103, the STM signal reception section 1405 receives STM frames (containing STM signals) from the STM device 1402 (1100) and stores the STM frames. The STM signal reception section 1405 terminates the layer 1 which is used between the STM device 1402 and the edge node 1103, extracts the STM signals from the STM frames, and sends the STM signals to the STM layer 1 frame generation section 1410.

The layer 1 between the STM device 1100 (1402) and the edge node 1103 is implemented by conventional specifications such as SDH (Synchronous Digital Hierarchy), PDH (Plesiochronous Digital Hierarchy), etc.

The STM signals are converted into layer 2 frames by the STM layer 1 frame generation section 1410. Concretely, the 64 Kbps×N channel voice signal (8 bits/125 μsec for each channel), whose destination is recognized by the STM device 1100 (1402) by provisioning, is packed in the layer 2 frame payload. A layer 2 frame header corresponding to the destination of the STM signals is added to the layer 2 frame payload by the STM layer 1 frame generation section 1410, thereby the STM layer 2 frame which is shown in FIG. 4B is generated.

Subsequently, the STM layer 1 frame generation section 1410 generates an STM layer 1 frame header including the "Packet Length" identifier (indicating the length of the STM layer 1 frame payload), the "Priority" identifier (indicating CBR data transfer), the "Protocol" identifier (indicating STM), the "Frame Mode" identifier (indicating "Single Frame") and the "Stuff" identifier (indicating "No Stuffing"), and adds the layer 1 frame header to the layer 2 frame. Incidentally, in the STM layer 1 frames, the "Frame Mode" identifier is always set to "00" (Single Frame) and the "Stuff" identifier is always set to "0" (No Stuffing) (see FIGS. 5B and 5C).

The CRC16 operation is conducted to the layer 1 frame header and the result is added to the bottom of the layer 1 frame header. As an option, the CRC16 or CRC32 is conducted to the layer 1 frame payload and the result is added to the rear end of the layer 1 frame.

By the above process, an STM layer 1 frame having the basic frame format shown in FIG. 2 is formed. More concretely, the layer 2 frame shown in FIG. 3A (containing the layer 2 frame header and the layer 2 frame payload in which the STM signals are packed) is packed in the STM layer 1 frame payload as shown in FIG. 4B, and the above identifiers shown in FIG. 5A are packed in the STM layer 1 frame header.

The scheduler section 1413 of the edge node 1103 grasps whether or not layer 1 frames to be transferred exist in the STM layer 1 frame generation section 1410, the ATM layer 1 frame generation section 1409 and the IP layer 1 frame generation section 1412.

When an STM layer 1 frame to be transferred is stored in the STM layer 1 frame generation section 1410, the scheduler section 1413 instructs the STM layer 1 frame generation section 1410 to output STM layer 1 frames periodically (125 μsec). According to the instructions of the scheduler section 1413, the STM layer 1 frame generation section 1410 outputs the STM layer 1 frames to the frame multiplexing section 1414 periodically (125 μsec).

The frame multiplexing section 1414 frame multiplexes the STM layer 1 frames from the STM layer 1 frame generation section 1410 with layer 1 frames supplied from the ATM layer 1 frame generation section 1409 and the IP layer 1 frame generation section 1412, and transmits the frame-multiplexed layer 1 frames to a transmission line (to the core node 1104).

The layer 1 frames transmitted by the edge node 1103 to the transmission line are terminated by the layer 1 termination section 1700 of the reception section (1600, 1601) of the core node 1104.

The layer 1 termination section 1700 establishes byte synchronization and frame synchronization with regard to each input line by use of the "Header CRC16" identifiers of the headers of the layer 1 frames. The layer 1 termination section 1700 establishes the frame synchronization by checking the "Header CRC16" identifier. If the result of the check is "0", the layer 1 termination section 1700 judges that the frame synchronization has been established.

The layer 1 termination section 1700 refers to the "Packet Length" identifier in the layer 1 frame header in order to establish frame synchronization with the next frame, thereby the reference of the "Header CRC16" identifier contained in the next layer 1 frame header is enabled.

Subsequently, the layer 1 termination section 1700 refers to the "Protocol" identifier in the layer 1 frame header and thereby judges the type (STM, ATM, IP) of the layer 2 frame contained in the payload of the layer 1 frame.

Layer 1 frames that are judged by the layer 1 termination section 1700 as STM layer 1 frames are sent to the STM layer 2 termination section 1701. The STM layer 2 termination section 1701 which received the STM layer 1 frames extracts STM layer 2 frames from the STM layer 1 frames.

The priority processing scheduler 1705 checks whether or not an STM layer 2 frame exists in the STM layer 2 termination section 1701. Incidentally, the "Priority" identifiers of the STM layer 1 frames have been set higher in comparison with layer 1 frames of other types.

Therefore, when an STM layer 2 frame exists in the STM layer 2 termination section 1701, the priority processing scheduler 1705 instructs the STM layer 2 termination section 1701 to output the STM layer 2 frames to the frame multiplexing section 1704.

According to the instructions of the priority processing scheduler 1705, the STM layer 2 termination section 1701 outputs the STM layer 2 frames to the frame multiplexing section 1704. The frame multiplexing section 1704 frame multiplexes the STM layer 2 frames from the STM layer 2 termination section 1701 with ATM layer 2 frames supplied from the ATM layer 2 termination section 1702 and IP layer 2 frames supplied from the IP layer 2 termination section 1703, and sends the frame-multiplexed layer 2 frames to the layer 2 frame switch 1602.

The layer 2 frame switch 1602 transmits the layer 2 frames to appropriate output lines (transmission section 1603 or 1604) based on the label information contained in the layer 2 frame headers.

In the transmission section (1603, 1604) of the core node 1104, the frame separation section 1804 judges the protocol type (STM, ATM, IP) of each layer 2 frame supplied from the layer 2 frame switch 1602 based on control information which is transferred in the core node 1104. Layer 2 frames that are judged by the frame separation section 1804 as STM layer 2 frames are sent to the STM layer 1 frame generation section 1801.

The transmission scheduler 1805 checks whether or not an STM layer 2 frame exists in the STM layer 1 frame generation section 1801. If an STM layer 2 frame exists in the STM layer 1 frame generation section 1801, the transmission scheduler 1805 instructs the STM layer 1 frame generation section 1801 to output STM layer 1 frames to the frame multiplexing section 1800 periodically (125 µsec). Incidentally, the transfer of the STM layer 1 frames is conducted with higher priority than layer 1 frames of other types.

According to the instructions of the transmission scheduler 1805, the STM layer 1 frame generation section 1801 converts the stored STM layer 2 frames into STM layer 1 frames and outputs the STM layer 1 frames to the frame multiplexing section 1800 periodically (125 µsec). The frame multiplexing section 1800 frame multiplexes the STM layer 1 frames from the STM layer 1 frame generation section 1801 with ATM layer 1 frames supplied from the ATM layer 1 frame generation section 1802 and IP layer 1 frames supplied from the IP layer 1 frame generation section 1803, and transmits the frame-multiplexed layer 1 frames to a transmission line (to the core node 1105).

Thereafter, the STM layer 1 frames are transferred to the edge node 1110 shown in FIG. 12 via the core nodes 1105 and 1109.

The edge node 1110 receives the layer 1 frames from the core node 1109. In the reception section of the edge node 1110, the frame separation section 1509 establishes bit synchronization, byte synchronization and frame synchronization by use of the headers of the layer 1 frames.

After the establishment of the frame synchronization, the frame separation section 1509 refers to the "Protocol" identifier of the layer 1 frame and thereby judges whether the data contained in the payload of the layer 1 frame is an STM layer 2 frame, an ATM layer 2 frame or an IP layer 2 frame.

The frame separation section 1509 also refers to the "Packet Length" identifier of the layer 1 frame header and thereby grasps the total length and the rear end of the layer 1 frame payload. In the case where the data contained in the layer 1 frame payload is an STM layer 2 frame, the frame separation section 1509 sends the layer 1 frame to the frame termination section 1508.

The frame termination section 1508 extracts STM signals from the STM layer 1 frame and sends the STM signals to the STM signal transmission section 1505. The STM signals are transferred by the STM signal transmission section 1505 to the STM device 1111 (1502).

As explained above, the STM layer 1 frames containing the STM signals are transferred to the destination at precisely fixed intervals (125 µsec) maintaining the end-to-end circuit quality monitoring functions (end-to-end performance monitoring functions).

Next, the transfer of ATM cells in the data transfer system of FIG. 12 will be explained in detail.

Referring to FIG. 15, in the transmission section of the edge node 1103, the ATM cell reception section 1404 receives ATM cells from the ATM device 1101 (1401). The ATM cell reception section 1404 terminates the layer 1 which is used between the ATM device 1101 (1401) and the edge node 1103, establishes ATM cell synchronization, and sends the ATM cells to the ATM layer 1 frame generation section 1409.

The ATM layer 1 frame generation section 1409 collects ATM cells corresponding to the same VP (Virtual Path) and thereby constructs ATM layer 2 frames which are shown in FIG. 4A. As shown in FIG. 4A, the ATM layer 2 frame contains a plurality of ATM cells. The ATM layer 1 frame generation section 1409 generates an ATM layer 2 frame header (containing a route label) and adds the ATM layer 2 frame header to the ATM layer 2 frame payload.

The ATM layer 1 frame generation section 1409 generates a layer 1 frame header including the "Packet Length" identifier (indicating the length of the ATM layer 1 frame payload), the "Priority" identifier (indicating the type (CBR, UBR, etc.) of ATM), the "Protocol" identifier (indicating ATM), the "Frame Mode" identifier (indicating "Single Frame") and the "Stuff" identifier (indicating "No Stuffing"), and adds the layer 1 frame header to the layer 2 frame. Incidentally, in the ATM layer 1 frames, the "Frame Mode" identifier is always set to "00" (Single Frame) and the "Stuff" identifier is always set to "0" (No Stuffing) (see FIGS. 5B and 5C).

The ATM layer 1 frame generation section 1409 conducts the CRC16 operation to the ATM layer 1 frame header and adds the result to the bottom of the ATM layer 1 frame header. Further, the ATM layer 1 frame generation section 1409 conducts the CRC16 or CRC32 to the ATM layer 1 frame payload and adds the result to the rear end of the ATM layer 1 frame.

After the transfer of the STM layer 1 frame from the STM layer 1 frame generation section 1410 to the frame multiplexing section 1414, the scheduler section 1413 instructs the ATM layer 1 frame generation section 1409 to output the ATM layer 1 frames to the frame multiplexing section 1414. According to the instruction, the ATM layer 1 frame generation section 1409 outputs the ATM layer 1 frames to the frame multiplexing section 1414.

The frame multiplexing section 1414 frame multiplexes the ATM layer 1 frames from the ATM layer 1 frame generation section 1409 with STM layer 1 frames supplied from the STM layer 1 frame generation section 1410 and IP layer 1 frames supplied from the IP layer 1 frame generation section 1412, and transmits the frame-multiplexed layer 1 frames to the transmission line (to the core node 1104).

In the reception section (1600, 1601) of the core node 1104, the layer 1 termination section 1700 receives the frame-multiplexed layer 1 frames and establishes byte synchronization and frame synchronization with regard to each input line by checking the "Header CRC16" identifier of each layer 1 frame header.

The layer 1 termination section 1700 refers to the "Protocol" identifiers of the headers of the layer 1 frames, thereby extracts ATM layer 1 frames, and sends the ATM layer 1 frames to the ATM layer 2 termination section 1702. The ATM layer 2 termination section 1702 which received the ATM layer 1 frame extracts the ATM layer 2 frame from the ATM layer 1 frame.

According to the instruction of the priority processing scheduler 1705, the ATM layer 2 frame stored in the ATM layer 2 termination section 1702 is outputted to the frame multiplexing section 1704 after the transfer of an STM layer 2 frame from the STM layer 2 termination section 1701 to the frame multiplexing section 1704.

The frame multiplexing section 1704 frame multiplexes the ATM layer 2 frames from the ATM layer 2 termination section 1702 with STM layer 2 frames supplied from the STM layer 2 termination section 1701 and IP layer 2 frames supplied from the IP layer 2 termination section 1703, and sends the frame-multiplexed layer 2 frames to the layer 2 frame switch 1602 of the core node 1104.

The layer 2 frame switch 1602 outputs the layer 2 frames to appropriate lines (transmission section 1603 or 1604) based on the label information which is contained in the layer 2 frame headers.

In the transmission section (1603, 1604) of the core node 1104, the frame separation section 1804 separates the frame-multiplexed layer 2 frames depending on their protocols (by use of the aforementioned control information), extracts ATM layer 2 frames, and sends the ATM layer 2 frames to the ATM layer 1 frame generation section 1802.

The ATM layer 1 frame generation section 1802 generates ATM layer 1 frames by use of the ATM layer 2 frames supplied from the frame separation section 1804 and the aforementioned control information.

The transmission scheduler 1805 instructs the ATM layer 1 frame generation section 1802 to output the ATM layer 1 frame to the frame multiplexing section 1800 after each of the periodical instructions (125 μL sec) to the STM layer 1 frame generation section 1801 to output STM layer 1 frames to the frame multiplexing section 1800.

According to the instructions of the transmission scheduler 1805, the ATM layer 1 frame generation section 1802 outputs the generated STM layer 1 frame to the frame multiplexing section 1800. The frame multiplexing section 1800 frame multiplexes the ATM layer 1 frames from the ATM layer 1 frame generation section 1802 with STM layer 1 frames supplied from the STM layer 1 frame generation section 1801 and IP layer 1 frames supplied from the IP layer 1 frame generation section 1803, and transmits the frame-multiplexed layer 1 frames to a transmission line (to the core node 1105).

Thereafter, the ATM layer 1 frames are transferred to the edge node 1110 shown in FIG. 12 via the core nodes 1105 and 1109.

In the reception section of the edge node 1110, the frame separation section 1509 establishes bit synchronization, byte synchronization and frame synchronization by use of the headers of the layer 1 frames.

After the establishment of the frame synchronization, the frame separation section 1509 refers to the "Protocol" identifier of the layer 1 frame and thereby judges whether or not the layer 1 frame is an ATM layer 1 frame.

The frame separation section 1509 also refers to the "Packet Length" identifier of the layer 1 frame header and thereby grasps the total length and the rear end of the layer 1 frame payload. In the case where the layer 1 frame is an ATM layer 1 frame, the frame separation section 1509 sends the ATM layer 1 frame to the frame termination section 1507.

The frame termination section 1508 extracts an ATM layer 2 frame from the ATM layer 1 frame, extracts ATM cells from the ATM layer 2 frame, and sends the ATM cells to the ATM cell transmission section 1504. The ATM cells are transferred by the ATM cell transmission section 1504 to the ATM device 1112 (1501).

As explained above, the ATM cells can be transferred together with data of different protocols (STM signals, IP packets) by use of a common frame format, therefore, different types of data can be handled and transferred in a network concurrently and with a common method.

Therefore, the STM networks, the ATM networks and the IP networks which have been constructed separately and independently can be integrated or constructed as a common integrated network.

Next, the transfer of IP packets in the data transfer system of FIG. 12 will be explained in detail.

Referring to FIG. 15, in the transmission section of the edge node 1103, the IP packet reception section 1403 receives IP packets (IP packet data) from the IP router 1102 (1400). The IP packet reception section 1403 terminates the layer 1 and the layer 2 which are used between the IP router 1102 (1400) and the edge node 1103, thereby extracts IP packets, and stores the IP packets in the IP layer 2 frame generation section 1408.

The route label generation section 1406 generates a route label based on the IP layer information (destination IP address, source IP address, "Protocol Identification") contained in the IP packet header. Depending on cases, header information of upper protocols (TCP (Transport Control Protocol), UDP (User Datagram Protocol)) at the front end of the IP packet payload is referred to for the generation of the route label.

The route label generation section 1406 sends the generated route label to the IP layer 2 frame generation section 1408.

The flow label generation section 1407 generates a flow label based on the header information of the IP packet. The flow label is a field which is referred to in the network for conducting flow distribution to two or more OCHs which are forming a link.

The flow labels have to be provided to the IP layer 2 frames so that the same IP flows (that is, IP flows having the same destination IP address and the same source IP address, or IP flows having the same destination IP address and the same source IP address and the same parameter in the IP header information) will have the same flow labels.

The flow label is calculated uniquely from the IP header information etc, however, it is preferable that the flow labels take random (as random as possible) values that are determined depending on the IP header information. For example, the flow label can be calculated by the flow label generation section 1407 by conducting the Hash operation to the IP layer information (the IP packet header). The flow label generation section 1407 sends the generated flow label to the IP layer 2 frame generation section 1408.

The IP layer 2 frame generation section 1408 generates an IP layer 2 frame by packing the IP packet in the IP layer 2 frame payload and packs the route label and the flow label in the IP layer 2 frame header. The IP layer 2 frames generated by the IP layer 2 frame generation section 1408 are stored in the IP layer 1 frame generation section 1412.

The scheduler section 1413 instructs the IP layer 1 frame generation section 1412 to output an IP layer 1 frame to the frame multiplexing section 1414 if the IP layer 1 frame generation section 1412 is storing an IP layer 1 frame. The scheduler section 1413 gives the above instruction after instructing the ATM layer 1 frame generation section 1409 to output an ATM layer 1 frame to the frame multiplexing section 1414. According to the instructions of the scheduler section 1413, the IP layer 1 frame generation section 1412 outputs a primary IP layer 1 frame to the frame multiplexing section 1414, giving higher priority than best effort IP layer 1 frames.

As mentioned before, a best effort IP layer 1 frame has to be transferred in a remaining space (best effort IP transfer space) between the STM layer 1 frame, the ATM layer 1 frames and the primary IP layer 1 frames in the 125 μsec transfer space, as shown in FIGS. 10 and 11.

Therefore, when the scheduler section 1413 instructs the IP layer 1 frame generation section 1412 to output a best effort IP layer 1 frame, the scheduler section 1413 informs the IP layer 1 frame generation section 1412 about the best effort IP transfer space length L (byte).

Based on the best effort IP transfer space length L, the IP layer 1 frame generation section 1412 determines the length etc. of a best effort IP layer 1 frame to be outputted to the frame multiplexing section 1414, as shown in the flow chart of FIG. 21. Incidentally, in FIG. 21, the explanation is given ignoring the "Payload CRC" field, for the sake of simplicity. In the case where the "Payload CRC" field is employed, the "Payload CRC" field is added to each IP layer 1 frame when the IP layer 1 frame is generated and transferred as a single frame, a BOM frame, a COM frame or an EOM frame, and the length of the "Payload CRC" field is taken into consideration in the calculations in the flow chart of FIG. 21.

When the IP layer 1 frame generation section 1412 received the instruction (to output a best effort IP layer 1 frame to the frame multiplexing section 1414) and a length parameter (indicating the best effort IP transfer space length L), the IP layer 1 frame generation section 1412 first judges whether or not there is an EOM frame remaining therein (step S2200). If a remaining EOM frame exists ("Yes" in the step S2200), the IP layer 1 frame generation section 1412 compares the length M of the EOM frame with the best effort IP transfer space length L (step S2201).

If the EOM frame length M is longer than the best effort IP transfer space length L ("M>L" in the step S2201), the IP layer 1 frame generation section 1412 partitions the EOM frame and extracts the first segment of the EOM frame. The length of the extracted first segment (including a header) is set to L.

The IP layer 1 frame generation section 1412 outputs the extracted first segment of the EOM frame to the frame multiplexing section 1414 as a COM frame. The remaining segment of the EOM frame is stored in the IP layer 1 frame generation section 1412 as an EOM frame (having a layer 1 frame header) (step S2202), thereby the process is ended.

If the EOM frame length M is equal to the best effort IP transfer space length L ("M=L" in the step S2201), the IP layer 1 frame generation section 1412 outputs the EOM frame to the frame multiplexing section 1414 without partitioning the EOM frame (step S2203), thereby the process is ended.

If the EOM frame length M is shorter than the best effort IP transfer space length L ("M<L" in the step S2201), the IP layer 1 frame generation section 1412 compares the best effort IP transfer space length L with the EOM frame length M and the minimal dummy frame length D added together (M+D) (step S2204).

If the length M+D is equal to the best effort IP transfer space length L ("M+D=L" in the step S2204), the IP layer 1 frame generation section 1412 outputs the EOM frame (length: M bytes) to the frame multiplexing section 1414 (step S2207) and thereafter outputs the minimal dummy frame (length: D bytes) to the frame multiplexing section 1414 (step S2208), thereby the process is ended.

If the length M+D is longer than the best effort IP transfer space length L ("M+D>L" in the step S2204), the IP layer 1 frame generation section 1412 inserts the stuff data after the payload of the EOM frame. The length of the stuff data is set to L−M−1 bytes. The 1 byte is used for the "Stuffing Length" identifier which indicates the length of the stuff data. Therefore, in the EOM frame to be transmitted, the "Stuffing Length" identifier (1 byte) is inserted at the top of the layer 1 frame payload and the stuff data (L−M−1 bytes) is inserted at the bottom of the layer 1 frame payload as shown in FIG. 7 (step S2205). Thereafter, the IP layer 1 frame generation section 1412 outputs the EOM frame to the frame multiplexing section 1414 (step S2206), thereby the process is ended.

If the length M+D is shorter than the best effort IP transfer space length L ("M+D<L" in the step S2204), the IP layer 1 frame generation section 1412 outputs the EOM frame to the frame multiplexing section 1414 and updates the value of the parameter L (best effort IP transfer space length L) into L−M (L−M→L) (step S2209).

If no remaining EOM frame exists ("No" in the step S2200) or if the update of the best effort IP transfer space length L has been conducted (step S2209), the IP layer 1 frame generation section 1412 judges whether a best effort IP layer 1 frame to be transferred next exists or not (step S2210).

If no best effort IP layer 1 frame to be transmitted next exists ("No" in the step S2210), the IP layer 1 frame generation section 1412 outputs a dummy frame of the length L to the frame multiplexing section 1414 so as to implement the periodical transmission of the STM layer 1 frames (step S2211), thereby the process is ended.

If a best effort IP layer 1 frame to be transmitted next exists ("Yes" in the step S2210), the IP layer 1 frame generation section 1412 obtains the length B of the best effort IP layer 1 frame to be transmitted next (step S2212), and compares the best effort IP layer 1 frame length B with the best effort IP transfer space length L (step S2213).

If the best effort IP layer 1 frame length B is longer than the best effort IP transfer space length L ("B>L" in the step S2213), the IP layer 1 frame generation section 1412 partitions the best effort IP layer 1 frame into a BOM frame of the length L and an EOM frame (step S2214). Thereafter, the IP layer 1 frame generation section 1412 outputs the BOM frame of the length L to the frame multiplexing section 1414 and stores the EOM frame (step S2215), thereby the process is ended.

If the best effort IP layer 1 frame length B is equal to the best effort IP transfer space length L ("B=L" in the step S2213), the IP layer 1 frame generation section 1412 outputs the best effort IP layer 1 frame to the frame multiplexing section 1414 as a single frame, without partitioning the best effort IP layer 1 frame (step S2216), thereby the process is ended.

If the best effort IP layer 1 frame length B is shorter than the best effort IP transfer space length L ("B<L" in the step S2213), the IP layer 1 frame generation section 1412 compares the best effort IP transfer space length L with the best effort IP layer 1 frame length B and the minimal dummy frame length D added together (B+D) (step S2217).

If the length B+D is equal to the best effort IP transfer space length L ("B+D=L" in the step S2217), the IP layer 1 frame generation section 1412 outputs the best effort IP layer 1 frame (length: B) to the frame multiplexing section 1414 as a single frame (step S2219) and thereafter outputs the minimal dummy frame (length: D) to the frame multiplexing section 1414 (step S2220), thereby the process is ended.

If the length B+D is longer than the best effort IP transfer space length L ("B+D>L" in the step S2217), the IP layer 1 frame generation section 1412 inserts the stuff data after the payload of the best effort IP layer 1 frame to be transmitted next. The length of the stuff data is set to L−B−1 bytes. The 1 byte is used for the "Stuffing Length" identifier which indicates the length of the stuff data. Therefore, in the best effort IP layer 1 frame to be transmitted next, the "Stuffing Length" identifier (1 byte) is inserted at the top of the layer 1 frame payload and the stuff data (L−B−1 bytes) is inserted at the bottom of the layer 1 frame payload as shown in FIG. 7 (step S2221). Thereafter, the IP layer 1 frame generation section 1412 outputs the best effort IP layer 1 frame to the frame multiplexing section 1414 (step S2222), thereby the process is ended.

If the length B+D is shorter than the best effort IP transfer space length L ("B+D<L" in the step S2217), the IP layer 1 frame generation section 1412 outputs the best effort IP layer 1 frame to the frame multiplexing section 1414 as a single frame and updates the value of the parameter L (best effort IP transfer space length L) into L−B (L−B→L) (step S2218). Thereafter, the IP layer 1 frame generation section 1412 returns to the step S2212.

By the algorithm which has been described above, the best effort IP transfer space of the length L is precisely filled and thereby the periodical transmission of the STM layer 1 frames (interval: 125 μsec) is implemented successfully.

The frame multiplexing section 1414 frame multiplexes the IP layer 1 frames (the primary IP layer 1 frames and the best effort IP layer 1 frames) from the IP layer 1 frame generation section 1412 with STM layer 1 frames supplied from the STM layer 1 frame generation section 1410 and ATM layer 1 frames supplied from the ATM layer 1 frame generation section 1409, and transmits the frame-multiplexed layer 1 frames to the transmission line (to the core node 1104).

In the reception section (1600, 1601) of the core node 1104, the layer 1 termination section 1700 receives the frame-multiplexed layer 1 frames and establishes byte synchronization and frame synchronization with regard to each input line by checking the "Header CRC16" identifier of each layer 1 frame header.

The layer 1 termination section 1700 refers to the "Protocol" identifiers of the headers of the layer 1 frames, thereby extracts IP layer 1 frames, and sends the IP layer 1 frames to the IP layer 2 termination section 1703.

The IP layer 2 termination section 1703 extracts an IP layer 2 frame from the payload of the IP layer 1 frame supplied from the layer 1 termination section 1700 if the IP layer 1 frame is a single frame.

If the IP layer 1 frame supplied from the layer 1 termination section 1700 is a BOM frame, the IP layer 2 termination section 1703 waits for the arrival of COM frames and an EOM frame, and thereafter reconstructs an IP layer 2 frame by connecting the payloads of the BOM frame, the COM frames and the EOM frame.

If the stuff data has been contained in the IP layer 1 frame, the IP layer 2 termination section 1703 removes the stuff data from the IP layer 1 frame.

The priority processing scheduler 1705, after giving the instructions to the STM layer 2 termination section 1701 and the ATM layer 2 termination section 1702, instructs the IP layer 2 termination section 1703 to output one or more primary IP layer 2 frames stored therein to the frame multiplexing section 1704. Thereafter, the priority processing scheduler 1705 instructs the IP layer 2 termination section 1703 to output one or more best effort IP layer 2 frames stored therein to the frame multiplexing section 1704.

According to the instructions of the priority processing scheduler 1705, the IP layer 2 termination section 1703 outputs the primary IP layer 2 frames and the best effort IP layer 2 frames to the frame multiplexing section 1704.

The frame multiplexing section 1704 frame multiplexes the IP layer 2 frames (the primary IP layer 2 frames and the best effort IP layer 2 frames) with STM layer 2 frames supplied from the STM layer 2 termination section 1701 and ATM layer 2 frames supplied from the ATM layer 2 termination section 1702, and sends the frame-multiplexed layer 2 frames to the layer 2 frame switch 1602 of the core node 1104.

The layer 2 frame switch 1602 transmits the layer 2 frames to appropriate output lines (transmission section 1603 or 1604) based on the label information contained in the layer 2 frame headers.

In the transmission section (1603, 1604) of the core node 1104, the frame separation section 1804 separates the frame-multiplexed layer 2 frames depending on their protocols (based on the control information transferred in the core node 1104), extracts IP layer 2 frames, and sends the IP layer 2 frames to the IP layer 1 frame generation section 1803.

According to the instructions of the transmission scheduler 1805, the IP layer 1 frame generation section 1803 converts the IP layer 2 frames into IP layer 1 frames and outputs the IP layer 1 frames to the frame multiplexing section 1800. The conversion from the IP layer 2 frames into the IP layer 1 frames is conducted in the same way as the conversion which is conducted in the edge node 1103.

The frame multiplexing section 1800 frame multiplexes the IP layer 1 frames from the IP layer 1 frame generation section 1803 with STM layer 1 frames supplied from the STM layer 1 frame generation section 1801 and ATM layer 1 frames supplied from the ATM layer 1 frame generation section 1802, and transmits the frame-multiplexed layer 1 frames to a transmission line (to the core node 1105).

FIGS. 13 and 14 are schematic diagrams showing the transfer of the IP layer 1 frames in a network by use of the route label and the flow label.

The route label which is contained in the layer 2 frame header of an IP layer 1 frame is used for determining relaying nodes (core nodes) for transferring the layer 1 frame. In the example of FIG. 13, the IP layer 1 frame is transferred from an edge node (EN) 1200 to an edge node (EN) 1207 via core nodes (CN) 1201, 1202 and 1204. The core node (CN) 1201 refers to the route label contained in the IP layer 1 frame and outputs the IP layer 1 frame to an output line (output port) corresponding to the route label, thereby the IP layer 1 frame is transferred to the core node (CN) 1202. Thereafter, switching is executed similarly by the core nodes (CN) 1202 and 1204, and thereby the IP layer 1 frame is transferred to the edge node (EN) 1207.

Each link between two core nodes is composed of two or more wavelengths (optical channels), however, the route label does not designate the wavelength for being used. The route label is only used for the determination of the transfer route of the IP layer 1 frame (the sequence of relaying nodes).

The flow label which is contained in the layer 2 frame header of an IP layer 1 frame designates a wavelength to be used for transferring the IP layer 1 frame when a link is composed of two or more wavelengths. The wavelength to be used for transferring an IP layer 1 frame is determined by each core node (CN) for each IP layer 2 frame (for each IP layer 1 frame), by referring to the flow label contained in the IP layer 1 frame as shown in FIG. 14. In the case of FIG. 14, the core node (CN) 1301 selects a wavelength from two or more wavelengths forming the link between the core nodes (CN) 1301 and 1302 by referring to the flow label of the IP layer 1 frame, and transmits the IP layer 1 frame to the core node (CN) 1302 by use of the selected wavelength. Incidentally, in a core node (CN), IP layer 2 frames having the same flow labels are transmitted by use of the same wavelength.

Referring again to the data transfer system of FIG. 12, in the reception section of the edge node 1110, the frame separation section 1509 receives frame-multiplexed layer 1 frames and establishes bit synchronization, byte synchronization and frame synchronization by referring to the layer 1 frame headers.

The frame separation section 1509 refers to the "Protocol" identifiers of the layer 1 frame headers, thereby extracts IP layer 1 frames from the frame-multiplexed layer 1 frames, and sends the IP layer 1 frames to the frame termination section 1506.

The frame termination section 1506 extracts an IP layer 2 frame from the payload of the IP layer 1 frame supplied from the frame separation section 1509 if the IP layer 1 frame is a single frame.

If the IP layer 1 frame supplied from the frame separation section 1509 is a BOM frame, the frame termination section 1506 waits for the arrival of COM frames and an EOM frame, and thereafter reconstructs an IP layer 2 frame by connecting the payloads of the BOM frame, the COM frames and the EOM frame.

If the stuff data has been contained in the IP layer 1 frame, the frame termination section 1506 removes the stuff data from the IP layer 1 frame.

The frame termination section 1506 extracts an IP packet from the IP layer 2 frame and sends the IP packet to the IP packet transmission section 1503. The IP packet transmission section 1503 transmits the IP packet to the IP router 1113 (1500).

As described above, in the operation of the data transfer system in accordance with the embodiment of the present invention, the STM layer 1 frames are transferred at fixed periods (125 μsec). Bit synchronization is established in the physical layer, and byte synchronization and frame synchronization are established by use of the "Header CRC16" identifier, thereby the STM signals are necessarily transferred at fixed intervals (125 μsec) maintaining the end-to-end circuit quality monitoring functions (end-to-end performance monitoring functions).

The STM signals, the ATM cells and the IP packets are transferred by use of a common frame format, therefore, the different types of information can be handled and managed in a network concurrently by a common method.

Therefore, the STM networks, the ATM networks and the IP networks which have been constructed separately and independently can be integrated or constructed as a common or integrated network.

By the definition of the route label and the flow label as transfer information for the IP layer 2 frames, IP packets can be transferred appropriately by simple procedures even when each link is composed of two or more wavelengths by means of WDM (Wavelength Division Multiplexing).

When the above embodiment is applied to an IP network (without STM and ATM), the primary IP layer 1 frames can be transferred at fixed intervals (125 μl sec, for example), and thereby the transfer of the primary IP layer 1 frames can be conducted with the same high quality (without delay variation) as the STM layer 1 frames of the above embodiment.

As set forth hereinabove, by the frame construction method, the frame construction device and the data transfer system in accordance with the present invention, different types of data (STM signals, ATM cells and IP packets) can be transferred in a network by use of a common frame format.

The layer 1 frames, containing the STM signals, the ATM cells and the IP packets addressed to different destinations, can be transferred to their destinations appropriately.

STM networks, ATM networks and IP networks which have been constructed separately and independently can be integrated or constructed as a common or integrated network.

Bit errors which can occur during the transfer of the layer 1 frames can be detected by each node by use of the "Payload CRC" field, thereby the link monitoring can be executed by each node. By use of the OAM frames, path monitoring with regard to a path from the ingress point to the egress point can be conducted by a node at the egress point by reference to the OAM frame.

The layer 2 frames and the layer 1 frames in accordance with the present invention can be constructed regardless of the size of the STM signal, the ATM cell or the IP packet which is packed in the layer 2 frame payload. Therefore, the layer 1 frame is constructed even if the size of data (STM signal, ATM cell or IP packet) to be transferred is very small. On the other hand, even when the amount of best effort IP packets to be transferred is very large, by the priority processing of the above embodiment in order of STM, ATM, primary IP and best effort IP, the STM layer 1 frames and the ATM layer 1 frames (and the primary IP layer 1 frames) can be transferred without being affected by the congestion in the best effort IP traffic.

The layer 1 frames in accordance with the present invention are frame multiplexed and transferred with predetermined periodicity (125 μsec, for example), thereby the bit synchronization in the physical layer can be established. By use of the "Header CRC16" identifiers of the layer 1 frame headers, the byte synchronization and the frame synchronization are established.

The type of data which is contained and transferred in the layer 1 frame can be detected by the reference to the "Protocol" identifier of the layer 1 frame header.

The priority (in data transfer) of the data contained and transferred in the layer 1 frame can be detected by the reference to the "Priority" identifier of the layer 1 frame header, thereby the STM layer 1 frames (CBR traffic) are transferred with the highest priority.

The length of the layer 1 frame header is fixed (6 bytes in the embodiment), thereby the reference to the header information (identifiers) can be conducted by each node easily and correctly.

In the case where the stuff data has been stuffed in the layer 1 frame payload in order to adjust the length of the layer 1 frame in the frame transfer, a node which received the layer 1 frame can easily remove the stuff data by the reference to the "Stuff" identifier and the "Stuffing Length" identifier.

The layer 1 frame in accordance with the present invention can accommodate and transfer the N-channel trunk signal of N×64 Kbps which has been transferred between conventional switches, therefore, the conventional telephone networks (voice transmission telecommunication networks) can be accommodated in the data transfer system of the present invention.

The STM layer 1 frames of the present invention can be transferred at precisely fixed intervals (125 μsec in the above embodiment) by the adjustment of the length of the best effort IP layer 1 frame. The adjustment of the best effort IP layer 1 frame length is conducted by the partitioning of the best effort IP layer 1 frame, the insertion of the stuff data etc. as explained referring to FIG. 21. Even when there is no best effort IP layer 1 frame to be transferred, the periodical transfer of the STM layer 1 frames (125 μsec) is maintained by the transfer of the dummy frames.

In the above embodiment, the transfer of the STM signals (contained in the STM layer 1 frames) can be executed with higher priority than the ATM signals (contained in the ATM layer 1 frames) and the IP packets (contained in the IP layer 1 frames), and the transfer of the ATM signals can be conducted with higher priority than the IP packets.

When the present invention is applied to an IP network (without STM and ATM), the primary IP layer 1 frames can be transferred at fixed intervals (125 μsec, for example), thereby the transfer of the primary IP packets can be conducted with the same high quality (without delay variation) as the conventional STM signals.

The best effort IP packets, which is of lower priority in the IP packets, are transferred with the lowest priority in the embodiment, thereby the STM signals, the ATM cells and the primary IP packets, which should be handled as high priority traffic, can be transferred with higher priority.

A core node which relays the layer 1 frames can judge the type (protocol) of data which is contained in the layer 1 frame by the reference to the "Protocol" identifier of the layer 1 frame header, thereby the core node is enabled to judge the priority of transfer of the layer 1 frame.

The core node which relays the layer 1 frames can transfer the STM signals (STM layer 1 frames) with the highest priority among the various types of data at precisely fixed intervals (125 μsec) so as to implement the end-to-end performance monitoring functions.

The core node which relays the layer 1 frames can determine the next node (output port) for transferring the layer 1 frame by the reference to the route label of the layer 2 frame header.

The core node which relays the layer 1 frames can select the wavelength for the transfer of the layer 1 frame by the reference to the flow label of the layer 2 frame header.

Incidentally, while the processes of the flow chart of FIG. 21 for the transfer of the best effort IP layer 1 frames were explained as processes on the level of layer 1 frames, it is also possible to let the edge nodes and core nodes conduct equivalent processes (partitioning, stuffing, etc.) on the level of layer 2 frames or IP packets.

The priority processing which was employed in the above embodiment is only an example and other algorithms can also be employed for the priority processing. For instance, while the transfer of a primary IP layer 1 frame in the fixed cycle (125 μsec) was executed after the transfer of all the ATM layer 1 frames stored in the node in the above embodiment, the transfer of the primary IP layer 1 frame can also be executed after the transfer of one ATM layer 1 frame. In the same way, while the transfer of a best effort IP layer 1 frame in the fixed cycle (125 μsec) was started after the transfer of all the primary IP layer 1 frames stored in the node, the transfer of the best effort IP layer 1 frame can also be started after the transfer of one primary IP layer 1 frame. The length of the fixed cycle (125 μsec) employed in the above embodiment can be changed depending on design requirements of the data transfer system.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A method of generating a plurality of layer 1 frames, having a common frame format, from a plurality of types of layer 2 data, including Synchronous Transfer Mode (STM) signals, Asynchronous Transfer Mode (ATM) cells, primary Internet Protocol (IP) packets, and best effort IP packets, the method comprising:

forming a payload for a layer 1 frame that includes the data of a layer 2 frame;

forming, based on a type of the data of the layer 2 frame, a layer 1 frame header including:

a packet length field to indicate a size of a payload portion of the layer 1 frame, a priority field to indicate a priority of the layer 1 frame, a protocol field to identify a protocol of the payload based on the type of the data in the layer 2 frame, a frame mode field to indicate a correspondence between the layer 1 frame and the layer 2 frame included within the payload, a stuff field to indicate whether stuff data is contained in the layer 1 frame, and a cyclic redundancy check (CRC) field to indicate a CRC result; and outputting the layer 1 frames in the common frame format, where the layer 1 frames that include the STM layer 2 data are periodically output, and when an idle transfer space immediately precedes a particular layer 1 frame that includes the STM layer 2 data being output:

inserting a dummy frame into the idle transfer space when the idle transfer space is sufficient to accommodate at least a minimum-length dummy frame, and inserting, when the idle transfer space is not sufficient to accommodate the minimum-length dummy frame, a partitioned layer 1 frame that includes the best effort IP packets or a layer 1 frame that includes the best effort IP packets and the stuff data into the idle transfer space, where a length of the stuff data is smaller than a sum of a length of the layer 1 frame header and the CRC field.

2. The method of claim 1, where the layer 2 frame includes a layer 2 header and a layer 2 payload section, and where the layer 2 header is located at the beginning of the payload of the layer 1 frame.

3. The method of claim 1, further comprising:
partitioning the layer 2 frame into segments; and
including different ones of the segments in different layer 1 frames.

4. The method of claim 1, where the payload for the layer 1 frame is included in a variable-length field.

5. The method of claim 4, where a length of the variable-length field is set between zero Kbytes and 64 Kbytes.

6. The method of claim 1, where the packet length field begins the layer 1 frame header, the priority field follows the packet length field, the protocol field follows the priority field, the frame mode field follows the protocol field, the stuff field follows the frame mode field, and the CRC field follows the stuff field.

7. The method of claim 6, where the layer 1 frame header consists of six bytes of information.

8. The method of claim 1, where the layer 1 frame header consists of six bytes of information.

9. The method of claim 1, further comprising:
forming the packet length field as two bytes of information;
forming the priority field as 10 bits of information;
forming the protocol field as three bits of information;
forming the frame mode field as two bits of information;
forming the stuff field as one bit of information; and
forming the CRC field as two bytes of information.

10. A network device comprising:
means for receiving one or more of an ATM (Asynchronous Transfer Mode) cell, a primary Internet Protocol (IP) packet, a best efforts IP packet, or an STM (Synchronous Transfer Mode) signal from another network device;
means for forming a layer 1 frame that includes the received ATM cell, primary IP packet, best efforts IP packet, or STM signal as payload data within the layer 1 frame;
means for forming a header for the layer 1 frame, the header including:
a packet length field to indicate a size of the payload data of the layer 1 frame,
a priority field to indicate a priority of the layer 1 frame,
a protocol field to identify a protocol of the payload data,
a frame mode field to indicate a correspondence between the layer 1 frame and the payload data within the layer 1 frame,
a stuff field to indicate whether stuff data is contained in the layer 1 frame, and
a cyclic redundancy check (CRC) field to indicate a CRC result;
means for determining whether the layer 1 frame has payload data associated with an STM protocol or the layer 1 frame is to be transferred via a transfer space before another layer 1 frame having payload data associated with the STM protocol;
means for inserting, when it is determined that the layer 1 frame is to be transferred via the transfer space before the other layer 1 frame having payload data associated with the STM protocol:
a dummy frame into an idle transfer space between the transfer space and the other layer 1 frame having payload data associated with the STM protocol, when the idle transfer space is sufficient to accommodate at least a minimum-length dummy frame, and
a partitioned layer 1 frame that includes payload data not associated with the STM protocol or a layer 1 frame that includes payload data not associated with the STM protocol and the stuff data into the idle transfer space, when the idle transfer space is not sufficient to accommodate the minimum-length dummy frame; and
means for transferring the layer 1 frame in a common frame format irrespective of the payload data to maintain frame synchronization.

11. The network device of claim 10, where the network device is an edge router.

12. The network device of claim 10, where the packet length field begins the layer 1 frame header, the priority field follows the packet length field, the protocol field follows the priority field, the frame mode field follows the protocol field, the stuff field follows the frame mode field, and the CRC field follows the stuff field.

13. The network device of claim 12, where the layer 1 header consists of six bytes of information.

14. The network device of claim 10, where the CRC result is calculated based on the packet length field, the priority field, the protocol field, the frame mode field, and the stuff field.

15. The network device of claim 10, where the payload for the layer 1 frame is included in a variable-length field.

16. The network device of claim 10, where the layer 1 frame header consists of six bytes of information.

17. A method of transferring, in a common layer 1 frame format, a plurality of types of data, including Synchronous Transfer Mode (STM) signals, Asynchronous Transfer Mode (ATM) cells, primary Internet Protocol (IP) packets, and best effort IP packets, the method comprising:
forming a payload for the layer 1 frame that includes data of a layer 2 frame;
forming a layer 1 frame header including:
a packet length field to indicate a size of a payload portion of the layer 1 frame,
a priority field to indicate a priority of the layer 1 frame,
a protocol field to identify a protocol of the data in the layer 2 frame,
a frame mode field to indicate a correspondence between the layer 1 frame and the layer 2 frame included within the payload,
a stuff field to indicate whether stuff data is contained in the layer 1 frame, and
a cyclic redundancy check (CRC) field to indicate a CRC result; and
outputting the layer 1 frame in the common frame layer 1 format, where two or more of the layer 1 frames that include the STM layer 2 data are transferred at fixed intervals, and when an idle transfer space is disposed between the fixed intervals:
inserting a dummy frame into the idle transfer space when the idle transfer space is sufficient to accommodate at least a minimum-length dummy frame, and
inserting, when the idle transfer space is not sufficient to accommodate the minimum-length dummy frame, a partitioned layer 1 frame that includes a type of layer 2 data other than the STM layer 2 data or a layer 1 frame that includes a type of layer 2 data other than the STM layer 2 data and the stuff data into the idle transfer space.

18. The method of claim 17, further comprising:
forming the packet length field as two bytes of information;
forming the priority field as 10 bits of information;
forming the protocol field as three bits of information;
forming the frame mode field as two bits of information;
forming the stuff field as one bit of information; and
forming the CRC field as two bytes of information.

* * * * *